United States Patent
Wu et al.

(10) Patent No.: US 11,641,629 B2
(45) Date of Patent: May 2, 2023

(54) SIDELINK SYNCHRONIZATION ASSISTANCE

(71) Applicant: QUALCOMM Incorporated, San Diego, CA (US)

(72) Inventors: Shuanshuan Wu, San Diego, CA (US); Anantharaman Balasubramanian, San Diego, CA (US); Kapil Gulati, Belle Mead, NJ (US); Gabi Sarkis, San Diego, CA (US); Tien Viet Nguyen, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 288 days.

(21) Appl. No.: 17/144,642

(22) Filed: Jan. 8, 2021

(65) Prior Publication Data
US 2021/0219248 A1 Jul. 15, 2021

Related U.S. Application Data

(60) Provisional application No. 62/959,661, filed on Jan. 10, 2020.

(51) Int. Cl.
*H04W 56/00* (2009.01)
*G04R 20/02* (2013.01)
*H04W 92/18* (2009.01)

(52) U.S. Cl.
CPC .......... *H04W 56/001* (2013.01); *G04R 20/02* (2013.01); *H04W 92/18* (2013.01)

(58) Field of Classification Search
CPC ............... H04W 56/001; H04W 92/18; H04W 56/0015; G04R 20/02
See application file for complete search history.

(56) References Cited

U.S. PATENT DOCUMENTS

2016/0338055 A1 11/2016 Yang et al.
2017/0353936 A1* 12/2017 Zhang .................. H04W 8/005
(Continued)

FOREIGN PATENT DOCUMENTS

WO WO-2017171284 A1 10/2017

OTHER PUBLICATIONS

CATT: "Feature Lead Summary on AI 7.2.4.3 Sidelink Synchronization Mechanism," 3GPP Draft, 3GPP TSG RAN WG1 Meeting #98bis, R1-1911714, 3rd Generation Partnership Project (3GPP), Mobile Competence Centre, 650, Route Des Lucioles, F-06921, Sophia-Antipolis Cedex, France, vol. RAN WG1, No. Chongqing. China, Oct. 14, 2019-Oct. 20, 2019, Oct. 22, 2019 (Oct. 22, 2019), XP051798956, 35 pages, Retrieved from the Internet: URL: https://ftp.3gpp.org/tsg_ran/WG1_RL1/TSGR1_98b/Docs/R1-1911714.zip R1-1911714.docx [retrieved on Oct. 22, 2019] section 5.2, 6, 601.

(Continued)

*Primary Examiner* — Kyaw Z Soe
(74) *Attorney, Agent, or Firm* — Loza & Loza, LLP/Qualcomm Incorporated

(57) ABSTRACT

Aspects relate to mechanisms for a base station to provide sidelink synchronization assistance to a plurality of user equipment (UEs). The base station may be configured to identify a detection time window that includes a sidelink synchronization resource configured for transmission of a sidelink synchronization signal on a sidelink carrier. The base station may further be configured to transmit an indication of the detection time window to the plurality UEs on a cellular carrier to enable the UEs to detect a sidelink synchronization signal on the sidelink carrier within the detection time window and synchronize communication on the sidelink carrier.

30 Claims, 16 Drawing Sheets

(56) References Cited

U.S. PATENT DOCUMENTS

2018/0368090 A1* 12/2018 Kadambar ........ H04W 72/1278
2019/0059071 A1*  2/2019 Khoryaev ............. H04W 4/027
2019/0098589 A1   3/2019 Chae et al.
2019/0116565 A1   4/2019 Chae et al.

OTHER PUBLICATIONS

International Search Report and Written Opinion—PCT/US2021/012857—ISA/EPO—dated May 10, 2021.

* cited by examiner

SIDELINK SYNCHRONIZATION ASSISTANCE

CROSS-REFERENCE TO RELATED APPLICATIONS

The present application for patent claims priority to and the benefit of U.S. Provisional Patent Application No. 62/959,661, titled "SIDELINK SYNCHRONIZATION ASSISTANCE" filed Jan. 10, 2020, and assigned to the assignee hereof and hereby expressly incorporated by reference herein as if fully set forth below in its entirety and for all applicable purposes.

TECHNICAL FIELD

The technology discussed below relates generally to wireless communication networks, and more particularly, to sidelink wireless communication.

INTRODUCTION

In many existing wireless communication systems, a cellular network is implemented by enabling wireless user equipment to communicate with one another through signaling with a nearby base station or cell. As a user equipment moves across the service area, handovers take place such that each user equipment maintains communication with one another via its respective cell.

Another scheme for a wireless communication system is a device-to-device (D2D) or peer to peer (P2P) network, in which wireless user equipment may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

One example of a sidelink wireless communication system is a vehicle-to-everything (V2X) communication system. V2X communication involves the exchange of information not only between vehicles themselves, but also between vehicles and external systems, such as streetlights, buildings, pedestrians, and wireless communication networks. V2X systems enable vehicles to obtain information related to the weather, nearby accidents, road conditions, activities of nearby vehicles and pedestrians, objects nearby the vehicle, and other pertinent information that may be utilized to improve the vehicle driving experience, increase vehicle safety, and support autonomous vehicles.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for a base station to provide sidelink synchronization assistance is disclosed. The method can include identifying a detection time window including a sidelink synchronization resource configured for transmission of a sidelink synchronization signal on a sidelink carrier, and transmitting, via a cellular carrier, an indication of the detection time window to a plurality of user equipment (UEs) communicating over the sidelink carrier.

Another example provides a base station including a processor, a wireless transceiver communicatively coupled to the processor and configured to communicate over a cellular carrier, and a memory communicatively coupled to the processor. The processor and the memory can be configured to identify a detection time window including a sidelink synchronization resource configured for transmission of a sidelink synchronization signal on a sidelink carrier, and transmit, via the cellular carrier, an indication of the detection time window to a plurality of user equipment (UEs) communicating over the sidelink carrier.

Another example provides a method for sidelink synchronization at a user equipment (UE). The method can include receiving, from a base station in wireless communication with the UE over a cellular carrier, an indication of a detection time window including a sidelink synchronization resource configured for transmission of a sidelink synchronization signal on a sidelink carrier, and detecting the sidelink synchronization signal on the sidelink carrier within the detection time window to synchronize communication with a set of one or more sidelink devices on the sidelink carrier.

Another example provides a user equipment (UE) including a processor, a wireless transceiver communicatively coupled to the processor and configured to communicate over a cellular carrier with a base station and over a sidelink carrier with a set of one or more sidelink devices, and a memory communicatively coupled to the processor. The processor and the memory can be configured to receive, from the base station, an indication of a detection time window including a sidelink synchronization resource configured for transmission of a sidelink synchronization signal on the sidelink carrier, and detect the sidelink synchronization signal on the sidelink carrier within the detection time window to synchronize communication with the set of one or more sidelink devices on the sidelink carrier.

These and other aspects of the invention will become more fully understood upon a review of the detailed description, which follows. Other aspects, features, and examples of the present invention will become apparent to those of ordinary skill in the art, upon reviewing the following description of specific, exemplary examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while exemplary examples may be discussed below as device, system, or method examples it should be understood that

DETAILED DESCRIPTION

Figure 1:
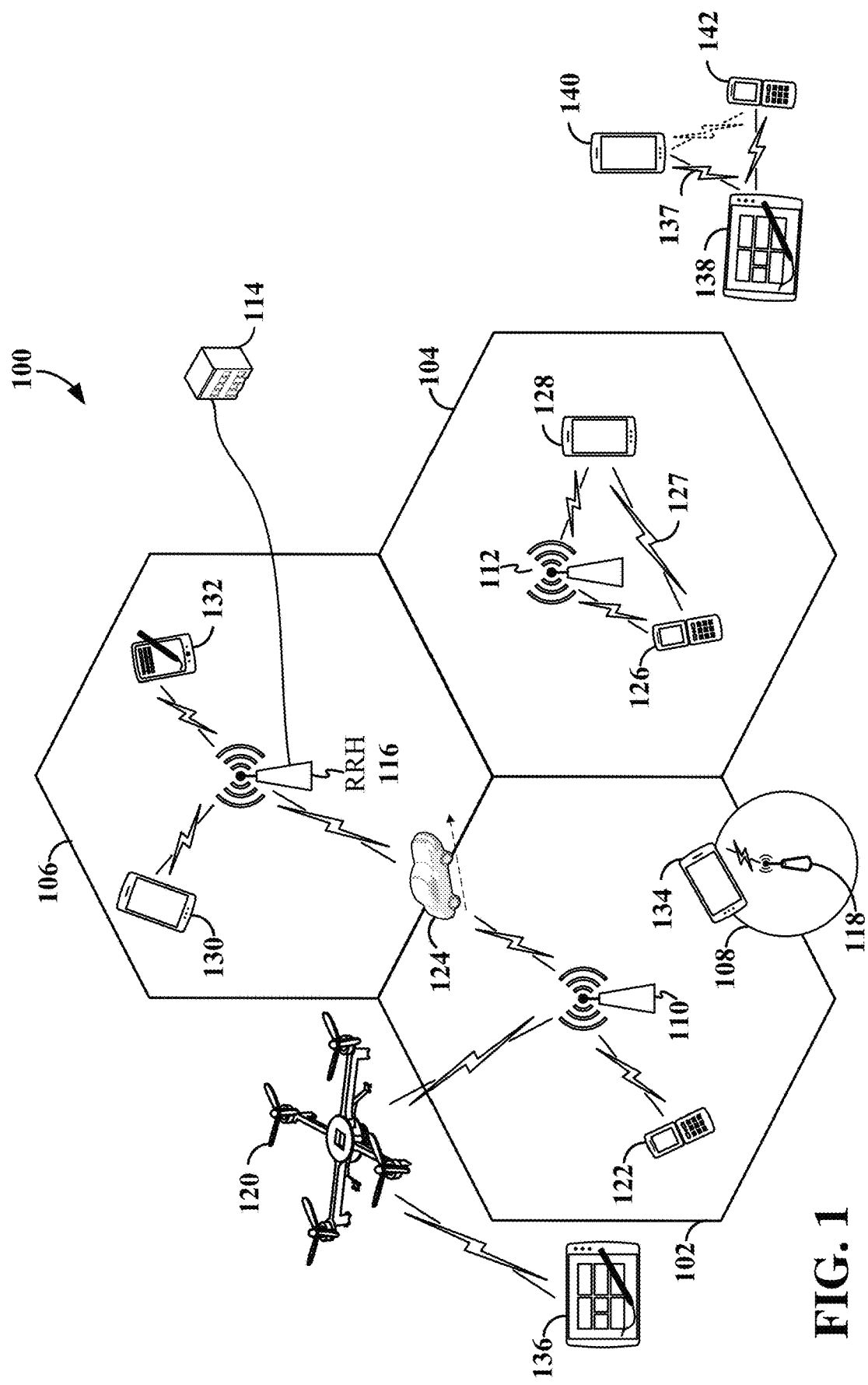
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to mechanisms for a base station to provide sidelink synchronization assistance to a plurality of user equipment (UEs). The base station may communicate with the UEs over a cellular carrier. The UEs may further be configured for sidelink communication over a sidelink carrier. The base station may be configured to identify a detection time window that includes a sidelink synchronization resource configured for transmission of a sidelink synchronization signal on the sidelink carrier. The base station may further be configured to transmit an indication of the detection time window to the plurality of UEs. The indication of the detection time window may be transmitted to the UEs via radio resource control (RRC) signaling or within a system information block (SIB). In some examples, the base station may further be configured to identify two or more detection time windows within a sidelink synchronization period, each including a respective sidelink synchronization resource, and to transmit respective indications of each of the two or more detection time windows to the plurality of UEs. Upon receiving the indication of the detection time window from the base station, a UE may be configured to detect the sidelink synchronization signal on the sidelink carrier within the detection time window to synchronize communication on the sidelink carrier.

In some examples, the base station may be configured to identify a sidelink synchronization configuration of the sidelink synchronization resource and determine the detection time window based on the sidelink synchronization configuration. In some examples, the sidelink synchronization configuration may indicate at least one direct frame associated with the sidelink carrier within which the sidelink synchronization resource is located. In this example, the base station may further be configured to map the sidelink synchronization configuration expressed as at least one direct frame number (DFN) of the at least one direct frame to a detection time window configuration expressed as at least one system frame number (SFN) of at least one system frame associated with the cellular carrier. In this example, the indication of the detection time window may include the at least one SFN of the at least one system frame. In some examples, the direct frames and system frames are offset in time and the base station may further be configured to map the DFN to the SFN based on the offset. In some examples, the base station may be synchronized with a global navigation satellite system (GNSS) to derive the DFN of the direct frame.

In some examples, the sidelink synchronization configuration may indicate at least one direct slot index of at least one direct slot of a direct frame within which the sidelink synchronization resource is located. The base station may further be configured to map the sidelink synchronization configuration expressed as the at least one direct slot index of the DFN of the direct frame to a detection time window configuration expressed as at least one system slot index of at least one system slot of at least one SFN of at least one system frame, where the at least one system slot covers a duration of time including the at least one direct slot. In some examples, the size of the detection time window (e.g., the number of system slots or duration of time of the detection time window) may be equal to or larger than the size of the at least one direct slot to account for a misalignment of slot boundaries between system slots and direct slots and/or different propagation delays between system slots and direct slots.

In some examples, the base station may be pre-configured with the sidelink synchronization configuration. In other examples, the base station may receive the sidelink synchronization configuration from one or more of the UEs. For example, a UE may transmit a sidelink synchronization signal report to the base station. The sidelink synchronization signal report may include an offset in time between direct frames and system frames. For example, the sidelink synchronization report may indicate a misalignment between the DFN and the SFN and/or between slot boundaries of direct slots and system slots. The sidelink synchronization signal report may further include the sidelink synchronization configuration (e.g., the DFN and/or direct slots within which the synchronization signal resource is located). In some examples, the sidelink synchronization signal report may include the indication of the detection time window expressed in terms of the system frame number.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

In FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quadcopter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

In the RAN 100, the ability for a UE to communicate while moving, independent of their location, is referred to as mobility. The various physical channels between the UE and the RAN are generally set up, maintained, and released under the control of an access and mobility management function (AMF) In some scenarios, the AMF may include a security context management function (SCMF) and a security anchor function (SEAF) that performs authentication. The SCMF can manage, in whole or in part, the security context for both the control plane and the user plane functionality. In various aspects of the disclosure, a RAN 100 may utilize DL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using peer to peer (P2P) or sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a P2P network, a D2D network, vehicle-to-vehicle (V2V) network, a vehicle-to-everything (V2X), a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

Figure 2:
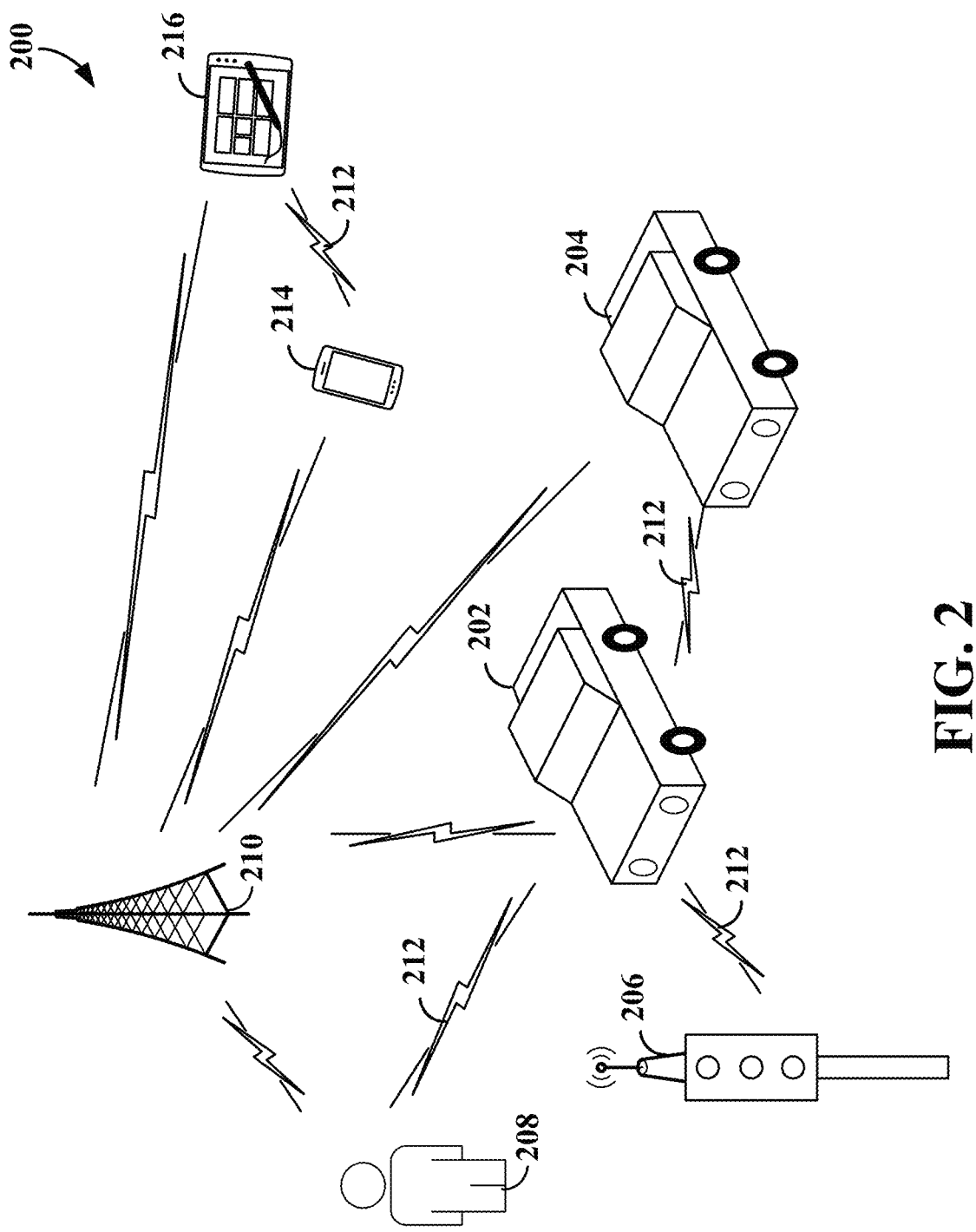
FIG. 2 is a diagram illustrating an example of a vehicle-to-everything (V2X) wireless communication network according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

To facilitate D2D sidelink communication between, for example, UEs 214 and 216 over the sidelink 212, the UEs 214 and 216 may transmit discovery signals therebetween. In some examples, each discovery signal may include a synchronization signal, such as a sidelink primary synchronization signal (PSS) and/or a sidelink secondary synchronization signal (SSS) that facilitates device discovery and enables synchronization of communication on the sidelink 212. For example, the discovery signal may be utilized by the UE 216 to measure the signal strength and channel status of a potential sidelink (e.g., sidelink 212) with another UE (e.g., UE 214). The UE 216 may utilize the measurement results to select a UE (e.g., UE 214) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 210).

In addition, there may be two main resource allocation modes of operation for sidelink (e.g., PC5) communications. In a first mode, Mode 1, a base station (e.g., gNB) 210 may allocate resources to sidelink devices (e.g., V2X devices or other sidelink devices) for sidelink communication between the sidelink devices in various manners. For example, the base station 210 may allocate sidelink resources dynamically (e.g., a dynamic grant) to sidelink devices, in response to requests for sidelink resources from the sidelink devices. The base station 210 may further activate preconfigured sidelink grants (e.g., configured grants) for sidelink communication among the sidelink devices. In Mode 1, sidelink feedback may be reported back to the base station 210 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

Figure 3:
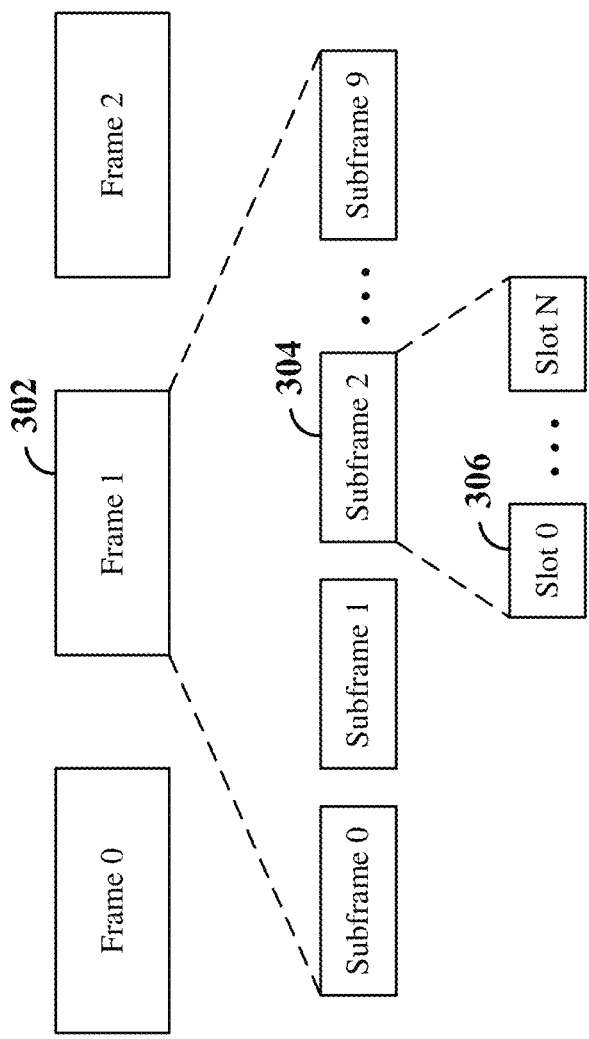
FIG. 3 is a diagram illustrating an example of a frame structure, according to some aspects.

Cellular and V2X communication may each be transmitted over a respective dedicated carrier (e.g., carrier frequency). Transmissions over the respective carrier may be organized into frames, subframes, and slots. Referring now to FIG. 3, a carrier may include spectrum that is time-divided into frames 302. In the example shown in FIG. 3, three frames 302 (Frame 0, Frame 1, and Frame 2) are illustrated. Each frame 302 may be further time-divided into a plurality of subframes 304. Each subframe 304 may have a duration of 1 ms, and each frame 302 may have a duration of 10 ms. Thus, each frame 302 may include ten subframes 304 (Subframe 0 . . . Subframe 9).

In addition, each subframe 304 may be time-divided into one or more slots 306 (Slot 0 . . . Slot N). The number of slots 306 and duration of each slot per subframe 304 may vary with the subcarrier spacing. For example, with a subcarrier spacing of 15 kHz, each subframe 304 may include one slot 306 with a slot duration of 1 ms. As another example, with a subcarrier spacing of 30 kHz, each subframe 304 may include two slots 306, each with a slot duration of 0.5 ms. In general, there may be 1, 2, 4, 8, or 16 slots 306 per subframe 304, as determined by the subcarrier spacing (e.g., numerology).

Various aspects of the present disclosure will be described with reference to an OFDM waveform, schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 4:
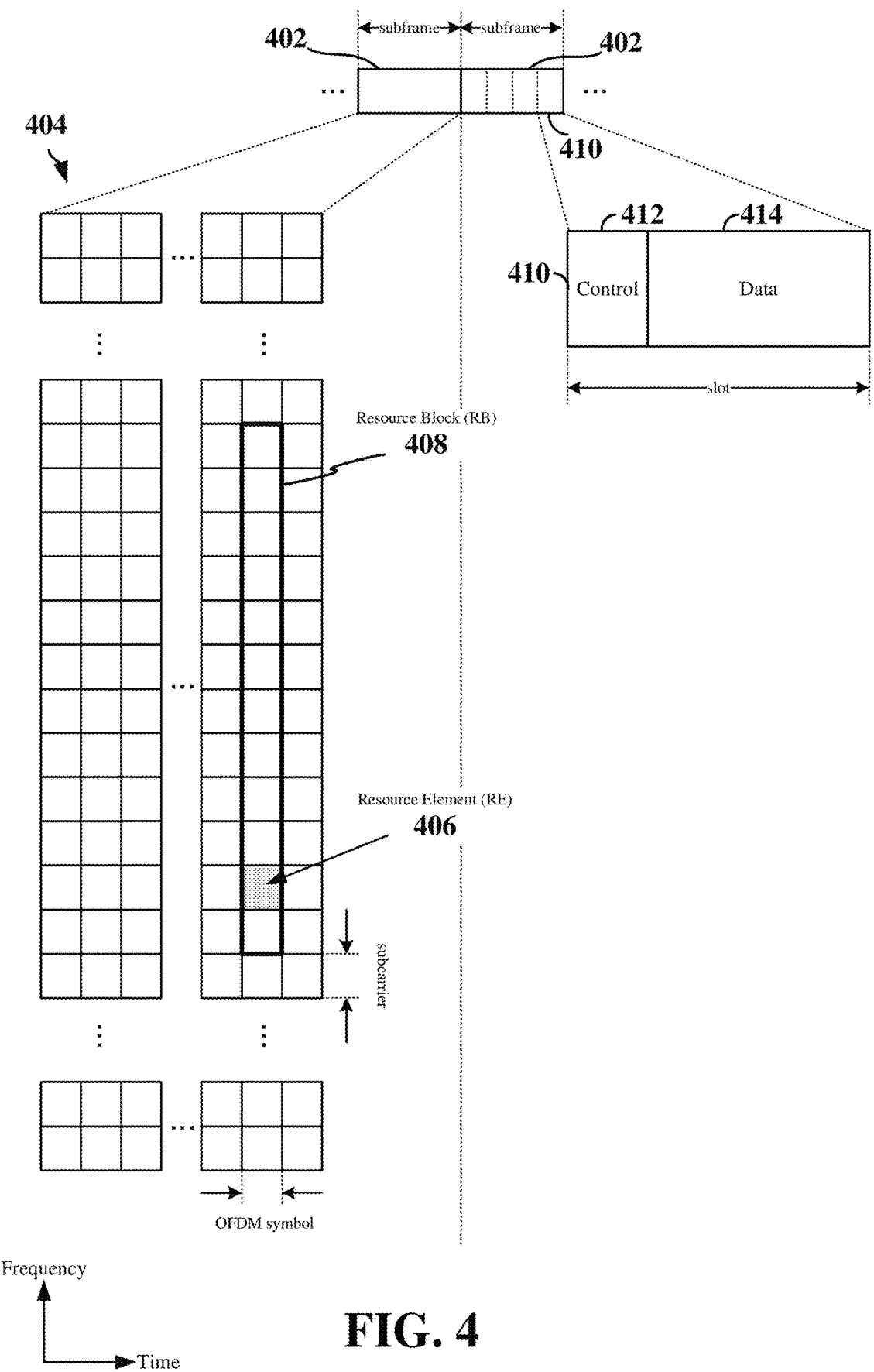
FIG. 4 is a schematic diagram illustrating organization of wireless resources in an air interface utilizing orthogonal frequency divisional multiplexing (OFDM) according to some aspects.

Referring now to FIG. 4, an expanded view of an exemplary subframe 402 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. That is, in a multiple-input-multiple-output (MIMO) implementation with multiple antenna ports available, a corresponding multiple number of resource grids 404 may be available for communication. The resource grid 404 is divided into multiple resource elements (REs) 406. An RE, which is 1 subcarrier x 1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

Scheduling of UEs or V2X/sidelink devices (hereinafter collectively referred to as UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 4, the various REs 406 within a RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIBs and DMRSs.

In an example of sidelink communication over a sidelink carrier via a PC5 interface, the control region 412 of the slot 410 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device.

In some examples, the sidelink control information may include synchronization information to synchronize communication between sidelink devices on the sidelink carrier. In addition, the sidelink control information may include scheduling information indicating one or more resource blocks within the data region 414 reserved by an initiating (or transmitting) sidelink device (e.g., the "scheduling entity") for sidelink communication. In some examples, the sidelink control information may further include information related to the data, such as a modulation and coding scheme utilized for the data. The data may include, for example, V2X data, such as status information (e.g., position, speed, acceleration, trajectory, etc.) and/or event information (e.g., traffic jam, icy road, fog, pedestrian crossing the road, collision, etc.), and may also include video data captured by a camera on a vehicle or coupled to an RSU.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 4 are not necessarily all of the channels or carriers that may be utilized between devices, and those of ordinary skill in the art will recognize that other channels or carriers may be utilized in addition to those illustrated, such as other traffic, control, and feedback channels.

Within a sidelink network, quality of service (QoS) and system performance may be affected by timing misalignments between sidelink devices. Therefore, to maintain a common synchronization of time and frequency among the sidelink devices, each of the sidelink devices may be synchronized either to a synchronization source, such as a gNB, eNB, or global navigation satellite system (GNSS), or based on a time/frequency reference within a sidelink device. One or more sidelink devices may further generate and transmit synchronization information for use by other sidelink devices in synchronizing the sidelink radio frame timing (e.g., radio frame boundaries and frame index) to the transmitting sidelink device. For example, the synchronization information may include a sidelink synchronization signal (S-SS). In some examples, the S-SS may be a sidelink synchronization block (S-SSB), which includes a sidelink primary synchronization signal (S-PSS), a sidelink secondary synchronization signal (S-SSS), and a physical sidelink broadcast channel (PSBCH). The S-SSB may further include a downlink modulation reference signal (DMRS), or other signals used for synchronization.

Figure 5:
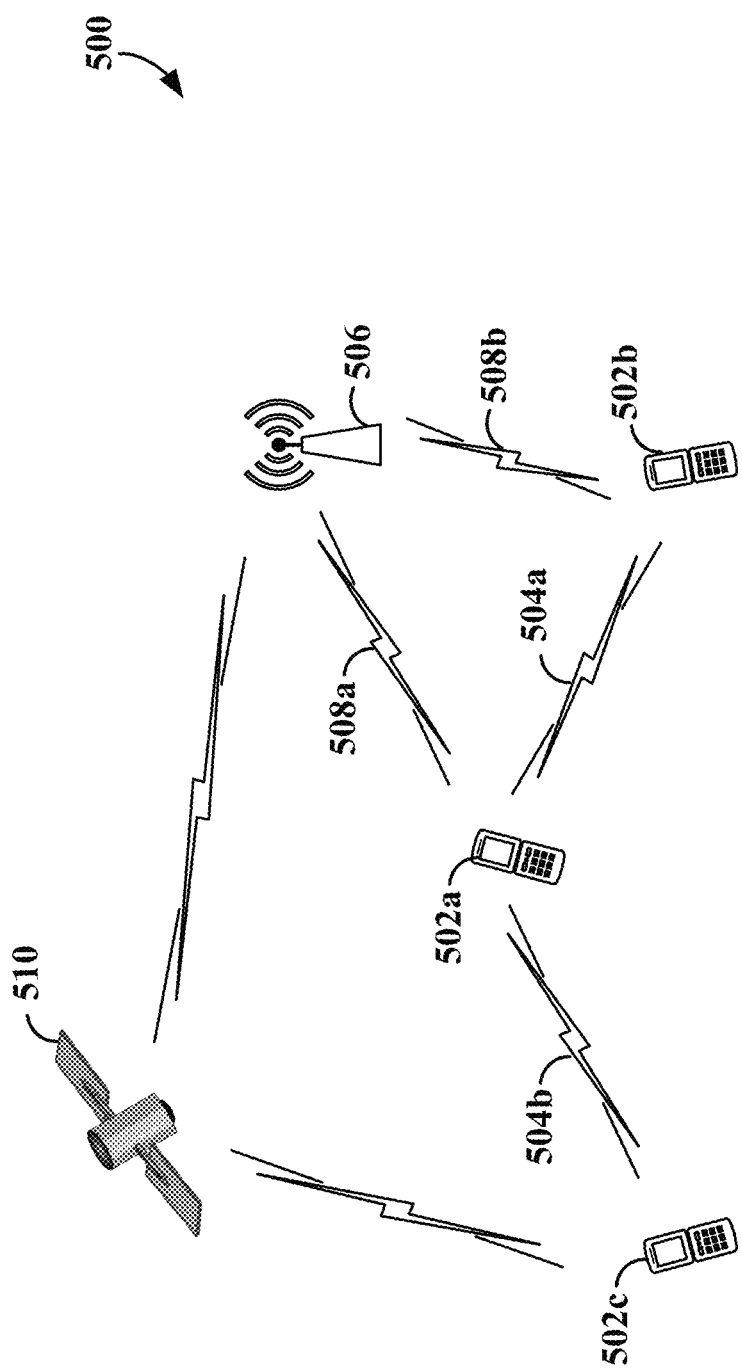
FIG. 5 is a diagram illustrating various examples of sidelink synchronization in a wireless communication network according to some aspects.

FIG. 5 is a diagram illustrating various examples of sidelink synchronization in a wireless communication network 500. The wireless communication network 500 includes a plurality of sidelink devices (e.g., UEs) 502a, 502b, and 502c, a base station (e.g., eNB or gNB) 506, and a global navigation satellite system (GNSS) 510. In some examples, the sidelink devices 502a, 502b, and 502c may be V2X devices within a V2X network.

The sidelink devices 502a and 502b may communicate over a first sidelink (e.g., PC5 interface) 504a, while sidelink devices 502a and 502c may communicate over a second sidelink 504b. Each sidelink 504a and 504b may utilize a sidelink carrier that may be time-divided into a plurality of frames, subframes, and slots. Sidelink devices 502a and 502b may further communicate with the base station 506 over respective cellular links (e.g., Uu interfaces) 508a and 508b, each utilizing a cellular carrier that may be time-divided into a plurality of frames, subframes, and slots. On the sidelink carrier, the frames, subframes, and slots may be referred to herein as direct frames, direct subframes, and direct slots. Each of the direct frames may be indexed by a respective direct frame number (DFN). In addition, each of the direct slots within a direct frame may be indexed by a respective direct slot index. On the cellular carrier, the frames, subframes, and slots may be referred to herein as system frames, system subframes, and system slots. Each of the system frames may be indexed by a respective system frame number (SFN). In addition, each of the system slots within a system frame may be indexed by a respective system slot index.

To communicate with other sidelink devices on the sidelink carrier, each sidelink device 502a, 502b, and 502c may be configured to synchronize communication therebetween. For example, each sidelink device 502a, 502b, and 502c may detect a synchronization signal for use in synchronizing sidelink communication in both time and frequency. In some examples, one or more sidelink devices 502a, 502b, and 502c may be within range of the GNSS 510 to receive a synchronization signal that may be utilized for sidelink synchronization. In the example shown in FIG. 5, UE 502c is configured to receive a synchronization signal from the GNSS 510. The UE 502c may utilize the synchronization information in the GNSS synchronization signal to synchronize the direct radio frame timing (e.g., direct radio frame boundaries and direct frame index/number) on the sidelink. For example, the UE 502c may derive the direct frame number (DFN) from the GNSS timing using the following equation:

$$\text{DFN} = \text{Floor}(0.1*(T_{current} - T_{ref} - \text{OffsetDFN})) \bmod 1024, \quad \text{(Equation 1)}$$

where $T_{current}$ is the current coordinated universal time (UTC) time obtained from the GNSS 510 expressed in milliseconds (ms), $T_{ref}$ is a reference UTC time 00:00:00 on Gregorian calendar date 1 January, 1900 expressed in ms, and OffsetDFN is the configured value (otherwise, this value is zero) expressed in ms.

In the example shown in FIG. 5, UE 502a may be out of the coverage area of the GNSS 510. Therefore, UE 502c may generate and transmit a sidelink synchronization signal (S-SS) based on the synchronization established with the GNSS 510. The S-SS may be received by the UE 502a, which may utilize the S-SS to synchronize the direct radio frame timing with the UE 502c. In addition, UE 502b may also be out of the coverage area of the GNSS 510. Therefore, UE 502a may generate and transmit a S-SS based on the synchronization established with the UE 502c to synchronize the timing of the UE 502b.

In some examples, a UE (e.g., UE 502a) may be self-synchronized (e.g., the UE 502a is not synchronized to another synchronization source, but rather is synchronized by its own timing/frequency reference). In this example, the UE 502a may serve as an independent synchronization source and generate and transmit a S-SS based on its internal clock. In some examples, the SFNs on the cellular carrier are aligned with the DFNs on the sidelink carrier. In this example, the base station 506 may serve as a synchronization source to synchronize communication between the UEs 502a and 502b on the sidelink carrier.

In some examples, various hierarchical synchronization procedures may be defined for UEs 502a-502c to synchronize communication on the sidelink carrier. In a first sidelink synchronization implementation, a UE communicating on the sidelink carrier may detect a synchronization signal for use in synchronization in the following order: GNSS 510, UEs directly synchronized to the GNSS 510, UEs indirectly synchronized to the GNSS 510, and other UEs serving as independent synchronization sources. In a second sidelink synchronization implementation, a UE communicating on the sidelink carrier may detect a synchronization signal for use in synchronization in the following order: GNSS 510, UEs directly synchronized to the GNSS 510, UEs indirectly synchronized to the GNSS 510, the base station 506, UEs directly synchronized to the base station 506, UEs indirectly synchronized to the base station 506, and other UEs serving as independent synchronization sources. For example, in the first and second sidelink synchronization implementations, UE 502c may detect the synchronization signal from the GNSS 510, UE 502a may detect the S-SS from UE 502c, and UE 502b may detect the S-SS from UE 502a.

In a third sidelink synchronization implementation, a UE communicating on the sidelink carrier may detect a synchronization signal for use in synchronization in the following order: base station 506, UEs directly synchronized to the base station 506, UEs indirectly synchronized to the base station 506, the GNSS 510, UEs directly synchronized to the GNSS 510, UEs indirectly synchronized to the GNSS 510, and other UEs serving as independent synchronization sources. For example, in the third sidelink synchronization implementation, UE 502a and 502b may detect the synchronization signal from the base station 506 and UE 502c may detect the S-SS from the UE 502a.

For V2P or P2V communication (e.g., sidelink transmissions to/from a pedestrian UE (P-UE)), a P-UE device (e.g., a smartphone or wearable device) may be sensitive to power consumption. In some examples, a P-UE may need to search for an S-SS transmitted from other UEs (e.g., vehicle UEs). For example, in the first or second sidelink synchronization implementation, a P-UE may be out of the coverage area of the GNSS 510. In the second or third sidelink synchronization implementation, a P-UE may be out of the coverage area of the GNSS and may not be able to synchronize with the base station 506 (e.g., the SFNs may not be aligned with DFNs or the base station 506 may not be configured as a sidelink synchronization source). Therefore, the P-UE may have to perform a blind detection of the S-SS transmitted by other UEs. Such continuous monitoring for synchronization signals (S-SS) transmitted by other UEs on the sidelink carrier may increase the power consumption on a P-UE devices.

Therefore, in various aspects of the disclosure, to reduce power consumption on P-UE and other types of V2X or sidelink devices, the base station 506 may enhance sidelink synchronization by providing sidelink synchronization assistance to UEs (e.g., UEs 506a and 506b) to enable the UEs 506a and 506b to detect the S-SS transmitted by other UEs on the sidelink carrier. In some examples, the base station 506 may identify a detection time window on the cellular carrier within which a sidelink synchronization resource is configured. Here, a sidelink synchronization resource refers to the time-frequency resources reserved on the sidelink carrier for an S-SS (e.g., S-SSB) transmission. For example, the sidelink synchronization resource may be configured in a periodical manner, such that within each sidelink synchronization period, one or multiple direct slots may be reserved for the transmission of an S-SSB or for the transmission of an S-SSB burst set.

In some examples, the base station may identify two or more detection time windows within a sidelink synchronization period, where each detection time window includes a respective sidelink synchronization resource. Each detection time window may include, for example, at least one system frame or one or more system slots of one or more system frames on the cellular carrier that cover a duration of time including the respective sidelink synchronization resource.

The base station 506 may further transmit a respective indication of each identified detection time window to each of the UEs 506*a* and 506*b*. In some examples, an indication of a detection time window may include at least one SFN or at least one system slot index of at least one SFN that includes the sidelink synchronization resource. In some examples, the base station 506 may transmit the indication of the detection time window via radio resource control (RRC) signaling. For example, the base station 506 may broadcast the indication of the detection time window within a system information block (SIB) or via dedicated RRC signaling.

In some examples, the base station 506 may be synchronized to the GNSS 510 and configured to derive the DFN (and therefore the mapping between DFNs and SFNs) from the GNSS timing using Equation 1 above. The base station 506 may further be provided with a sidelink synchronization configuration of the sidelink synchronization resource configured for transmission of the S-SS on the sidelink carrier. For example, the sidelink synchronization configuration may indicate at least one direct frame or one or more direct slots of a direct frame on the sidelink carrier within which the sidelink synchronization resource is located. Based on the derived DFN mapping and the sidelink synchronization configuration, the base station 506 may determine the detection time window. For example, the base station 506 may determine that the detection time window includes at least one system frame or one or more system slots of one or more system frames based on a mapping between the sidelink synchronization configuration and a detection time window configuration of the detection time window. Here, the sidelink synchronization configuration is expressed in terms of direct frame numbers or direct slot indexes of direct frame numbers, while the detection time window configuration is expressed in terms of system frame numbers or system slot indexes of system frame numbers.

In examples in which the sidelink synchronization configuration is at the frame level (e.g., identifies at least one DFN of at least one direct frame within which the sidelink synchronization resource is located), the base station 506 may be configured to map the sidelink synchronization configuration expressed as the at least one DFN of the at least one direct frame to the detection time window configuration expressed as at least one SFN of at least one system frame corresponding to the at least one direct frame. In some examples, the direct frames and system frames are aligned such that the frame boundaries and indexing match between direct frames and system frames. In this example, the DFN(s) included in the sidelink synchronization configuration are equivalent to the SFN(s) included the detection time window configuration. In other examples, the direct frames and system frames are offset in time with respect to frame boundaries and/or indexing. In this example, the base station 506 maps the DFN(s) of the direct frame(s) to the SFN(s) of the system frame(s) based on the offset.

In examples in which the sidelink synchronization configuration is at the slot level (e.g., identifies one or more direct slots of a direct frame within which the sidelink synchronization resource is located), the base station 506 may be configured to map the sidelink synchronization configuration expressed as at least one direct slot index of at least one direct slot of the DFN of the direct frame to the detection time window configuration expressed as at least one system slot index of at least one system slot of at least one SFN of at least one system frame. In this example, the at least one system slot identified in the detection time window configuration covers a duration of time including the at least one direct slot. Thus, the at least one direct slot occurs within the duration of the at least one system slot. In some examples, a detection time window size of the detection time window is equal to or larger than a direct slot size of the one or more direct slots. For example, the detection time window size may include the at least one direct slot within which the sidelink synchronization resource is located, and may further include additional direct slots adjacent to the at least one direct slot containing the sidelink synchronization resource to account for a misalignment of slot boundaries between system slots and direct slots and/or different propagation delays between system slots and direct slots.

The sidelink synchronization configuration may be pre-configured on the base station 506 or may be received from one or more UEs (e.g., UE 502*a* and/or UE 502*b*). For example, a UE (e.g., UE 502*a*) may be configured to generate and transmit a sidelink synchronization signal report including the sidelink synchronization configuration to the base station 506.

In some examples, the base station 506 may not be synchronized with the GNSS 510. In this example, the sidelink synchronization report may include the offset in time between the direct frames and the system frames to enable the base station 506 to determine the mapping between the DFN and the SFN. The sidelink synchronization report may further include the sidelink synchronization configuration unless pre-configured on the base station. In some examples, the sidelink synchronization report may include the indication of the detection time window expressed in terms of SFNs (or system slot indexes of SFNs). In this example, the UE (e.g., UE 502*a*) may be configured to determine the offset in time between system frames and direct frames based on respective synchronization on the sidelinks 504*a* and 504*b* and cellular link 508*a* (e.g., Uu synchronization may be performed on the downlink from the base station 506 and UEs 502*a* and 502*b*). The UE 502*a* may then be configured to map the sidelink synchronization configuration to the detection time window configuration based on the offset in time between system frames and direct frames to identify the detection time window.

Figure 6:
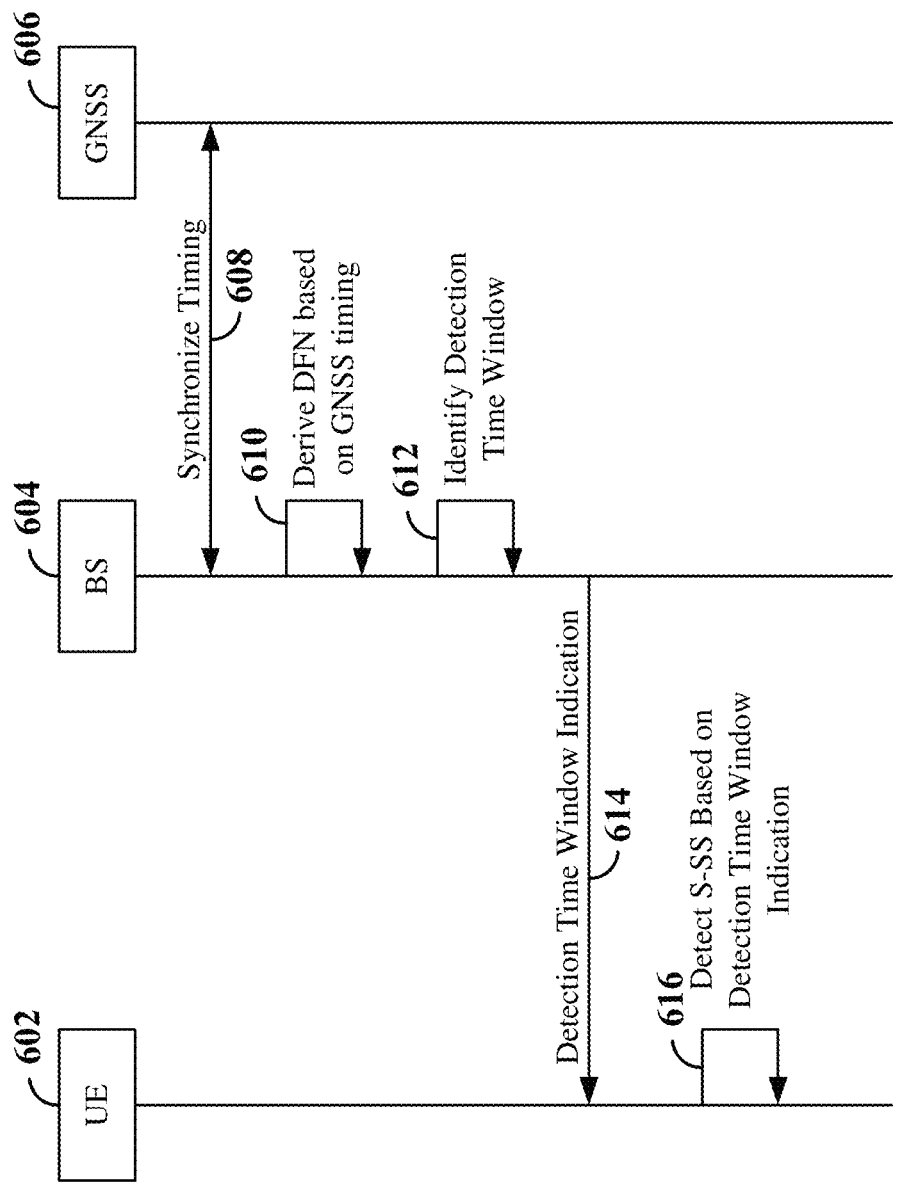
FIG. 6 is a signaling diagram illustrating an example of base station-assisted sidelink synchronization according to some aspects.

FIG. 6 is a signaling diagram illustrating an example of base station-assisted sidelink synchronization according to some aspects. In the example shown in FIG. 6, a base station 604 is in the coverage area of a GNSS 606 to facilitate sidelink synchronization by a UE 602 served by the base station 604. At 608, the base station 604 may synchronize timing with the GNSS 606. At 610, the base station 604 may derive the DFN of a direct frame on a sidelink carrier utilized for communication between the UE 602 and other UEs (not shown). From the DFN, the base station 604 may determine whether there is an offset in time with respect to frame boundaries and/or indexing between the direct frames on the sidelink carrier and system frames on a cellular carrier utilized for communication between the base station 604 and the UE 602. In some examples, the base station 604 may further determine whether there is an offset in time with respect to slot boundaries between direct slots on the sidelink carrier and system slots on the cellular carrier.

At 612, the base station may identify a detection time window on the cellular carrier that includes a sidelink synchronization resource configured for transmission of a sidelink synchronization signal on the sidelink carrier. The base station may identify the detection time window based on the DFN, the offset (if any) between direct frames/slots and system frames/slots and a sidelink synchronization configuration of the sidelink synchronization resource. In some examples, the sidelink synchronization configuration is configured or pre-configured on the base station. In other examples, the sidelink synchronization configuration may be received from another UE (not shown) communicating on the sidelink carrier. The sidelink synchronization configuration may indicate at least one direct frame or one or more direct slots within a direct frame within which the sidelink synchronization resource is located. The base station may be configured to map the sidelink synchronization configuration of the sidelink synchronization resource expressed as at least one DFN or one or more direct slot indexes of a DFN to a detection time window configuration of the detection time window expressed as at least one SFN or one or more system slot indexes of one or more SFNs.

At 614, the base station 604 may be configured to transmit an indication of the detection time window to the UE 602. For example, the indication may indicate the sidelink synchronization period associated with the detection time window (e.g., it may be the same as the period of S-SS resource configuration) and time location of the detection time window within each period. The detection time window may include one or multiple system slots expressed by SFN corresponding to the direct slot index/DFN within which the synchronization signal resource is located or one or more system slots indexes of one or more SFNs covering a duration of time including the one or more direct slots of the corresponding DFN. In some examples, the base station 604 may transmit the indication of the detection time window via radio resource control (RRC) signaling. For example, the base station 604 may broadcast the indication of the detection time window within a system information block (SIB) or via dedicated RRC signaling. At 616, the UE 602 may detect the S-SS transmitted by another UE on the sidelink carrier within the detection time window to synchronize communication on the sidelink carrier.

Figure 7:
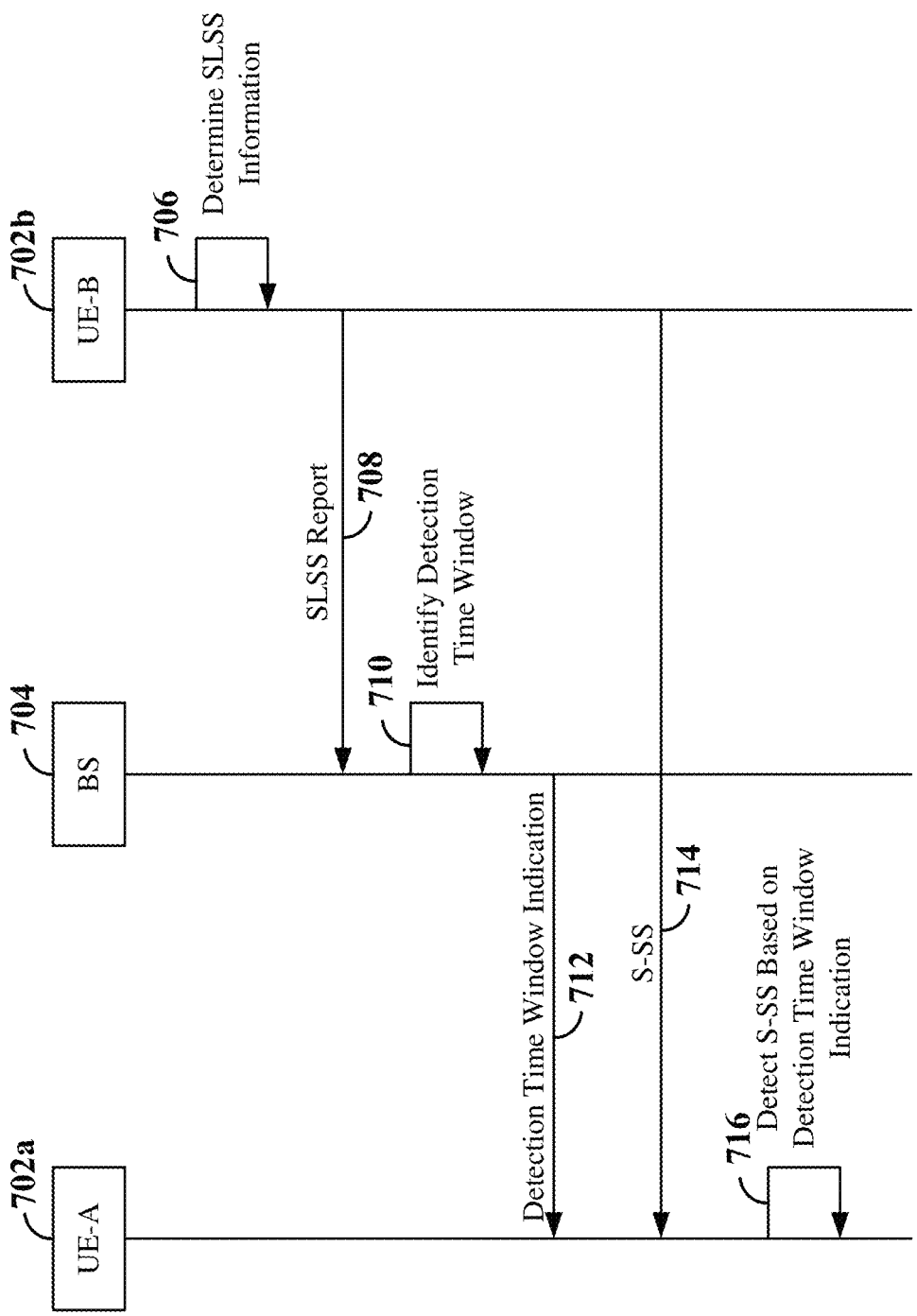
FIG. 7 is a signaling diagram illustrating another example of base station-assisted sidelink synchronization according to some aspects.

FIG. 7 is a signaling diagram illustrating another example of base station-assisted sidelink synchronization according to some aspects. In the example shown in FIG. 7, a base station 704 is in wireless communication with a plurality of UEs (e.g., UE-A 702a and UE-B 702b) via a cellular carrier. In some examples, UE-A 702a may be a pedestrian UE (P-UE) and UE-B 702b may be a vehicle UE (V-UE).

At 706, one of the UEs (e.g., UE-B 702b) may determine sidelink synchronization signal (SLSS) information. In some examples, the SLSS information may include a sidelink synchronization configuration of a sidelink synchronization resource configured for transmission of a S-SS on a sidelink carrier. In some examples, the SLSS information may include frame offset information indicating an offset in time between direct frames communicated on the sidelink carrier and system frames communicated on the cellular carrier. In some examples, the SLSS information may further include slot offset information indicating an offset in time between slot boundaries of direct slots communicated on the sidelink carrier and system slots communicated on the cellular carrier. The slot offset information may indicate slot boundary misalignments between direct slots and system slots or measured propagation delays of direct slots and system slots. In some examples, the SLSS information may include an indication of a detection time window on the cellular carrier including the sidelink synchronization resource allocated on the sidelink carrier.

At 708, the UE-B 702b may transmit an SLSS report to the base station 704 including the SLSS information. At 710, the base station may identify a detection time window on the cellular carrier that includes a sidelink synchronization resource configured for transmission of a sidelink synchronization signal on the sidelink carrier based on the SLSS information. In some examples, the base station may determine the mapping between DFNs and SFNs based on the offset in time between direct frames/slots and system frames/slots included in the SLSS information. The base station may then identify the detection time window based on the DFN and the sidelink synchronization configuration, which may be included in the SLSS or pre-configured on the base station 704. The sidelink synchronization configuration may indicate at least one DFN or one or more direct slot indexes within a DFN within which the sidelink synchronization resource is located. The base station may be configured to map the sidelink synchronization configuration of the sidelink synchronization resource expressed as at least one DFN or one or more direct slot indexes of a DFN to a detection time window configuration of the detection time window expressed as at least one SFN or one or more system slot indexes of one or more SFNs. In some examples, the base station 704 may identify the detection time window based on the indication of the detection time window included in the SLSS information.

At 712, the base station 704 may be configured to transmit an indication of the detection time window to the UE-A 702a. For example, the indication of the detection time window may include at least one SFN corresponding to the at least one DFN within which the synchronization signal resource is located or one or more system slot indexes of one or more SFNs covering a duration of time including the one or more direct slots of the corresponding DFN. In some examples, the base station 704 may transmit the indication of the detection time window via radio resource control (RRC) signaling. For example, the base station 704 may broadcast the indication of the detection time window within a system information block (SIB) or via dedicated RRC signaling.

At 714, the UE-B 702b may be configured to transmit a S-SS within the allocated sidelink synchronization resource. At 716, the UE-A 702a may detect the S-SS transmitted by the UE-B 702b on the sidelink carrier within the detection time window to synchronize communication on the sidelink carrier.

Figure 8:
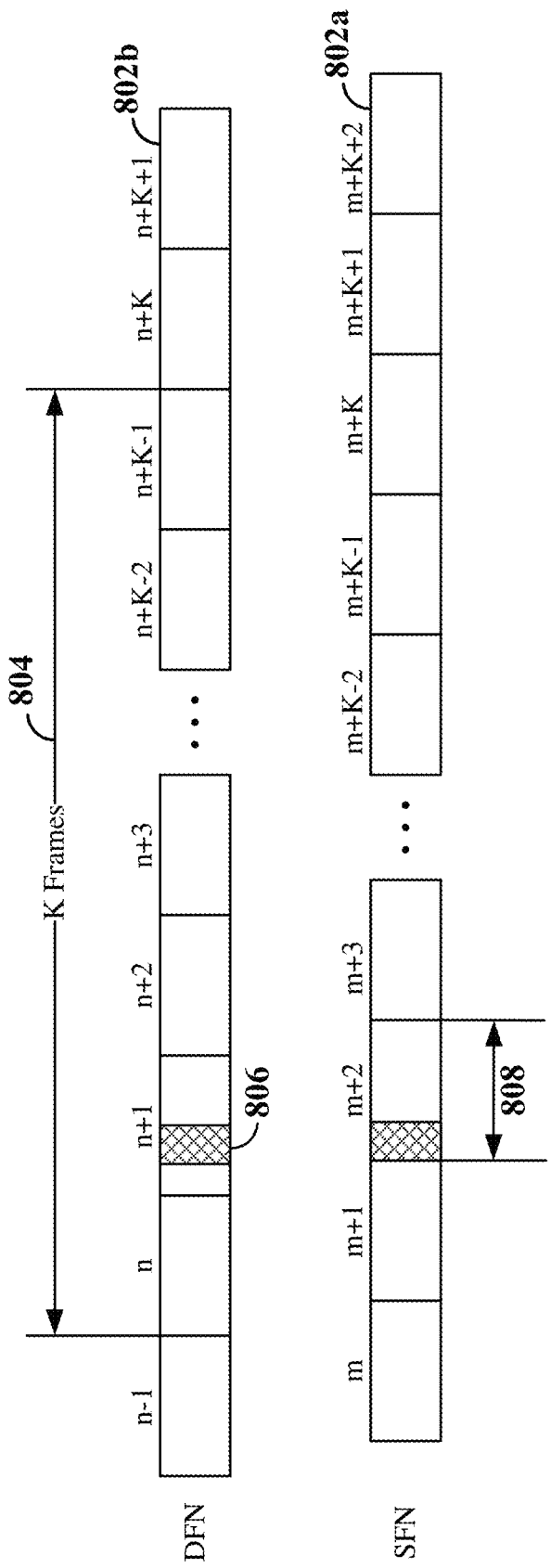
FIG. 8 is a diagram illustrating timing misalignments between direct frames of a sidelink carrier and system frames of a cellular carrier according to some aspects.

FIG. 8 is a diagram illustrating timing misalignments between direct frames 802b of a sidelink carrier and system frames 802a of a cellular carrier according to some aspects. In the example shown in FIG. 8, the direct frames 802b are indexed as direct frame n−1, direct frame n, direct frame n+1, direct frame n+2, direct frame n+3 . . . direct frame n+K−2, direct frame n+K−1, direct frame n+K, and direct frame n+K+1. In addition, the system frames 802a are indexed as system frame m, system frame m+1, system frame m+2, system frame m+3 . . . system frame m+K−2, system frame m+K−1, system frame m+K, system frame m+K+1, and system frame m+K+2. The direct frames 802b and system frames 802a are offset in time with respect to both indexing and frame boundaries. For example, direct frame n−1 is offset in time from system frame m.

A sidelink synchronization period 804 is formed of K frames (e.g., direct frame n through direct frame n+K−1). In some examples, K may be equal to sixteen frames (or 160 ms). One or more direct frames 802b within the sidelink synchronization period 804 may be configured to include a sidelink synchronization resource allocated for the transmission of a S-SS on the sidelink carrier. In the example shown in FIG. 8, direct frame n+1 includes a sidelink synchronization resource 806 allocated for the transmission of a S-SS on the sidelink carrier. For example, the sidelink synchronization resource 806 may include one or more slots within direct frame n+1 (e.g., the second direct frame 802*b* of the sidelink synchronization period 804). Thus, the sidelink synchronization configuration of the sidelink synchronization resource 806 shown in FIG. 8 may indicate that direct frame n+1 includes the sidelink synchronization resource 806.

Based on the offset in time (e.g., offset in frame boundaries and difference between DFN indexing and SFN indexing), the sidelink synchronization configuration expressed as direct frame n+1 may be mapped to a detection time window configuration of a detection time window 808 expressed as a corresponding system frame 802*a* corresponding to direct frame n+1. Here, the corresponding system frame 802*a* is system frame m+2. The corresponding system frame m+2 is selected as the system frame 802*a* that includes the sidelink synchronization resource 806 (e.g., the same time resources as the sidelink synchronization resource 806). Thus, as shown in FIG. 8, the detection time window 808 of system frame m+2 includes the sidelink synchronization resource 806 in direct frame n+1 on the sidelink carrier.

In some examples, the timing misalignment between direct frames 802*b* and system frames 802*a* may result in the sidelink synchronization resource 806 spanning more than one system frame 802*a*. As an example, the detection time window 808 may include two system frame numbers to cover all of the sidelink synchronization resource 806.

Figure 9:
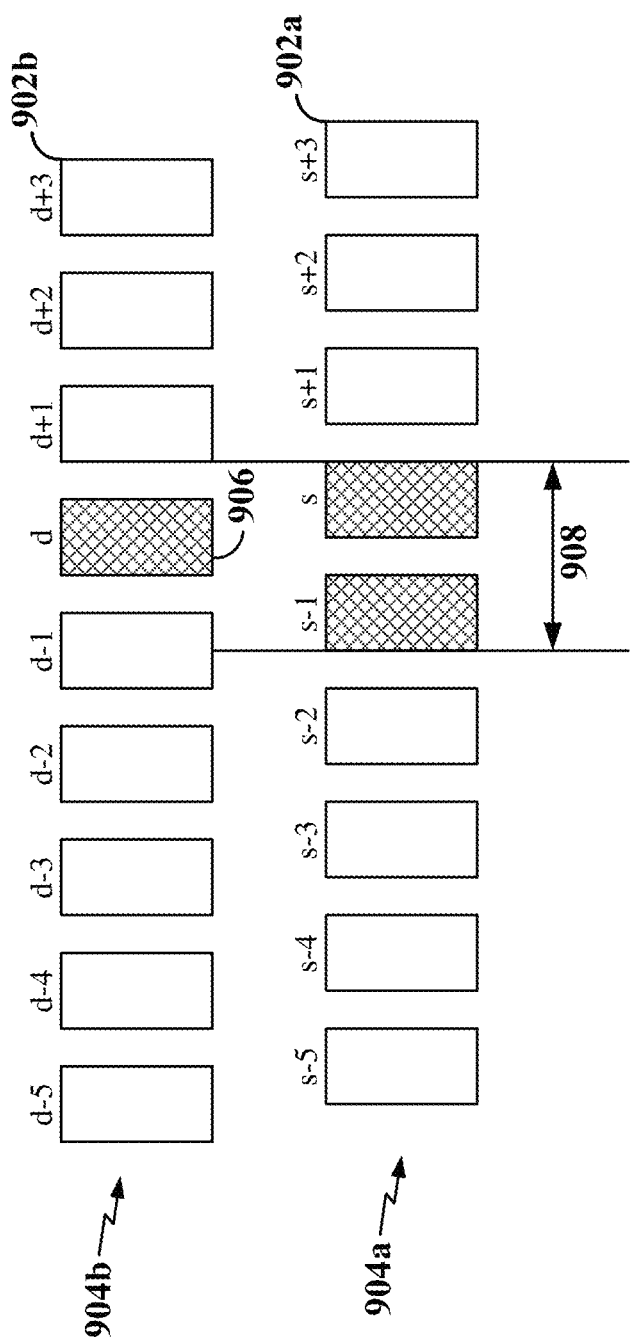
FIG. 9 is a diagram illustrating timing misalignments between direct slots of a direct frame and system slots of a system frame according to some aspects.

FIG. 9 is a diagram illustrating timing misalignments between direct slots 902*b* of a direct frame 904*b* and system slots 902*a* of a system frame 904*a* according to some aspects. In the example shown in FIG. 9, direct slots indexed as d−5, d−4, . . . d+3 are offset in time with respect to system slots indexed as s−5, s−4 . . . s+3. The offset may be a result of a misalignment of slot boundaries between the system slots 902*a* and direct slots 902*b* and/or different propagation delays between the system slots 902*a* and direct slots 902*b*. In the example shown in FIG. 9, direct slot d includes a sidelink synchronization resource 906 allocated for the transmission of a S-SS on the sidelink carrier. Thus, the sidelink synchronization configuration of the sidelink synchronization resource 906 shown in FIG. 9 may indicate that slot d of direct frame 904*b* includes the sidelink synchronization resource 906.

Based on the offset in time (e.g., misalignment in slot boundaries and/or propagation delays), the sidelink synchronization configuration expressed as direct slot d of direct frame 904*b* may be mapped to a detection time window configuration of a detection time window 908 expressed as one or more system slots 902*a* of the corresponding system frame 904*a* that cover a duration of time including the direct slot d. Here, the one or more system slots 902*a* include system slots s−1 and s. Thus, as shown in FIG. 9, the size of the detection time window 908, which includes two system slots s−1 and s, is larger than the size of the direct slot d to ensure that the detection time window 908 includes the sidelink synchronization resource 906.

In some examples, the system slots 902*a* included in the detection time window 908 may span two system frames 904*a*. For example, system slot s−1 may be included within a first system frame, while system slot s may be included in a second system frame. In this example, the detection time window configuration of the detection time window 908 includes the system slot indexes of each SFN in the detection time window 908.

Figure 10:
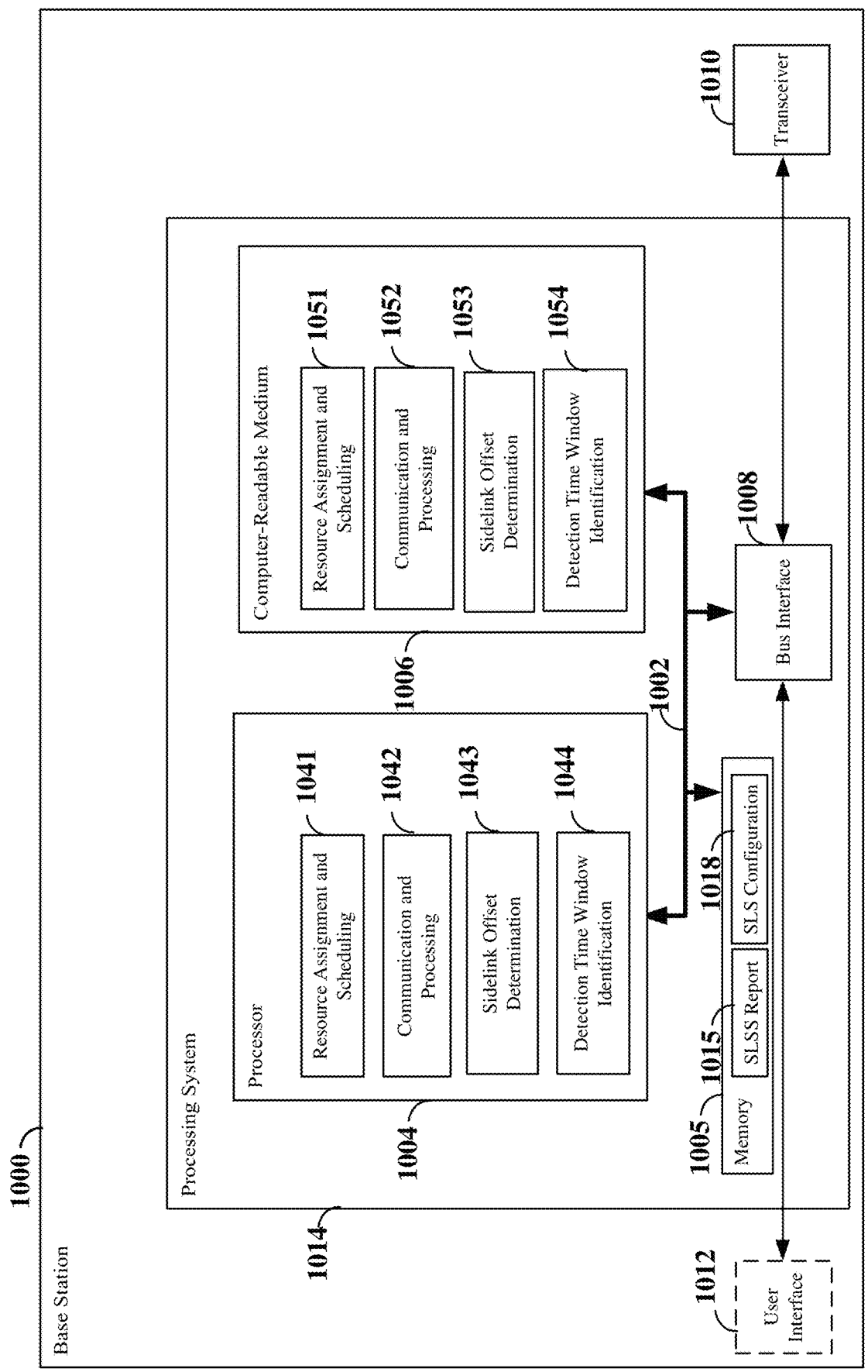
FIG. 10 is a diagram illustrating an example of a hardware implementation for a base station employing a processing system according to some aspects.

FIG. 10 is a block diagram illustrating an example of a hardware implementation for a base station 1000 employing a processing system 1014. For example, the base station 1000 may correspond to a gNB or eNB, as shown and described above in reference to FIGS. 1, 2 and/or 5.

The base station 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1000 may be configured to perform any one or more of the functions described herein. That is, the processor 1004, as utilized in the base station 1000, may be used to implement any one or more of the processes and procedures described below.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further.

A bus interface 1008 provides an interface between the bus 1002 and a transceiver 1010. The transceiver 1010 provides a means for communicating with various other apparatus over a transmission medium (e.g., air interface). Depending upon the nature of the apparatus, a user interface 1012 (e.g., keypad, display, touch screen, speaker, microphone, control knobs, etc.) may also be provided. Of course, such a user interface 1012 is optional, and may be omitted in some examples.

The processor 1004 is responsible for managing the bus 1002 and general processing, including the execution of software stored on the computer-readable medium 1006. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. In some examples, the computer-readable medium 1006 may be part of the memory 1005. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include resource assignment and scheduling circuitry 1041, configured to generate, schedule, and modify a resource assignment or grant of time-frequency resources (e.g., a set of one or more resource elements). For example, the resource assignment and scheduling circuitry 1041 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1041 may be configured to allocate/schedule resources on the downlink for the transmission of an indication of a detection time window including a sidelink synchronization resource configured for the transmission of a sidelink synchronization signal to one or more UEs. For example, the resource assignment and scheduling circuitry 1041 may be configured to schedule resources for the transmission of an RRC signal including the indication of the detection time window. In addition, the resource assignment and scheduling circuitry 1041 may further be configured to allocate resources on the uplink for a UE to transmit a sidelink synchronization signal report to the base station 1000. For example, the resource assignment and scheduling circuitry 1041 may be configured to allocate resources for a UE to transmit an uplink RRC signal or uplink medium access control—control element (MAC-CE) including the sidelink synchronization signal report. The resource assignment and scheduling circuitry 1041 may further be configured to execute resource assignment and scheduling software 1051 stored in the computer-readable medium 1006 to implement one or more of the functions described herein.

The processor 1004 may further include communication and processing circuitry 1042, configured to communicate with one or more UEs via the transceiver 1010. The communication and processing circuitry 1042 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1042 may be configured to generate and transmit downlink user data traffic and downlink control channels within one or more subframes, slots, and/or mini-slots in accordance with the resources assigned to the downlink user data traffic and/or downlink control information by the resource assignment and scheduling circuitry 1041. In addition, the communication and processing circuitry 1042 may be configured to receive and process uplink user data traffic and uplink control channels within one or more subframes, slots, and/or mini-slots in accordance with the resources assigned to the uplink user data traffic and/or uplink control information by the resource assignment and scheduling circuitry 1041.

In some examples, the communication and processing circuitry 1042 may be configured to generate and transmit the indication of the detection time window to the one or more UEs via the transceiver 1010. For example, the communication and processing circuitry 1042 may be configured to generate an RRC signal, such as a dedicated RRC signal or SIB, including the indication of the detection time window. In some examples, the communication and processing circuitry 1042 may be configured to generate and transmit respective indications of two or more detection time windows within a sidelink synchronization period. Each detection time window indication may be included within the same RRC signal or within separate RRC signaling. The communication and processing circuitry 1042 may further be configured to receive one or more sidelink synchronization signal (SLSS) reports 1015 from a UE via the transceiver 1010. The SLSS report(s) 1015 may further be stored, for example, in memory 1005. The communication and processing circuitry 1042 may further be configured to execute communication and processing software 1052 stored on the computer-readable medium 1006 to implement one or more functions described herein.

The processor 1004 may further include sidelink offset determination circuitry 1043, configured to determine a frame offset between direct frames communicated on a sidelink carrier and system frames communicated on a cellular carrier. In some examples, the sidelink offset determination circuitry 1043 may be configured to synchronize with a global navigation satellite system (GNSS) to derive the DFN and determine the offset in frame boundaries and/or indexing based on the DFN and the SFN. For example, the sidelink offset determination circuitry 1043 may be configured to derive the DFN over a frame duration and compare the DFN to the SFN over the frame duration to determine misalignments in frame boundaries and/or indexing between direct frames and system frames. In some examples, the received SLSS report 1015 may include the frame offset and the sidelink offset determination circuitry 1043 may be configured to access the SLSS report 1015 stored in memory 1005 to retrieve the frame offset.

The sidelink offset determination circuitry 1043 may further be configured to determine a slot offset between direct slots communicated within direct frames on the sidelink carrier and system slots communicated within system frames on the sidelink carrier. For example, the slot offset may be the result of a misalignment of slot boundaries between the system slots and direct slots and/or different propagation delays between the system slots and direct slots. The sidelink offset determination circuitry 1043 may determine the slot offset based on the SLSS report 1015 and/or propagation delay measurements/estimates performed by the base station 1000. For example, the SLSS report 1015 may include the slot offset (e.g., based on observed slot boundary misalignments or measured propagation delays at the UE). The slot offset may indicate, for example, an offset in time between a start of a direct slot and a start of system slot, an offset in time between an end of a direct slot and an end of a system slot, or other suitable offset measurement. The sidelink offset determination circuitry 1043 may further be configured to execute sidelink offset determination software 1053 stored on the computer-readable medium 1006 to implement one or more functions described herein.

The processor 1004 may further include detection time window identification circuitry 1044, configured to identify a detection time window that includes the sidelink synchronization resource configured for transmission of a sidelink synchronization signal on the sidelink carrier. In some examples, the detection time window identification circuitry 1044 may be configured to determine the detection time window based on a sidelink synchronization (SLS) configuration 1018 of the sidelink synchronization resource. The SLS configuration 1018 may be pre-stored on the memory 1005 of the base station 1000 or may be received within the SLSS report 1015.

In some examples, the SLS configuration 1018 may indicate at least one direct frame or one or more direct slots of a direct frame within which the sidelink synchronization resource is located. The detection time window identification circuitry 1044 may be configured to map the SLS configuration expressed as at least one DFN of the at least one direct frame or at least one direct slot index of at least one direct slot of a DFN to a detection time window configuration expressed as at least one SFN of at least one system frame or at least one system slot index of at least one system slot of at least one SFN of at least one system frame. The at least one SFN or at least one system slot index of at least one SFN cover a duration of time including the sidelink synchronization resource. Thus, the sidelink synchronization resource is fully contained within the detection time window.

In some examples, the detection time window identification circuitry 1044 may receive the frame/slot offset from the sidelink offset determination circuitry 1043 and utilize the frame/slot offset to map the SLS configuration to the detection time window configuration. For example, the detection time window identification circuitry 1044 may map the DFN of the direct frame including the sidelink synchronization resource to the SFN of the corresponding system frame based on the frame offset. In addition, the detection time window identification circuitry 1044 may map the one or more direct slots including the sidelink synchronization resource to the one or more corresponding system slots based on the slot offset. In some examples, the detection time window identification circuitry 1044 may map the one or more direct slots to the one or more corresponding system slots such that a size of the detection time window (e.g., the duration/number of the one or more system slots) is larger than a size of the one or more direct slots to account for misalignments in slot boundaries.

In some examples, the detection time window identification circuitry 1044 may identify the detection time window by accessing the SLSS report 1015, which includes an indication of the detection time window. For example, the SLSS report 1015 may indicate that the detection time window includes at least one SFN or at least one system slot index of at least one SFN. In some examples, the detection time window identification circuitry 1044 may be configured to identify two or more detection time windows within a sidelink synchronization period. Each of the detection time windows may include a respective sidelink synchronization resource.

The detection time window identification circuitry 1044 may further be configured to provide the indication of the detection time window (as indicated in the SLSS report 1015 or determined by the detection time window identification circuitry 1044 based on the SLS configuration 1018 and any offset determined by the sidelink offset determination circuitry 1043) to the communication and processing circuitry 1042 to transmit the indication of the detection time window to one or more UEs served by the base station 1000. The detection time window identification circuitry 1044 may further be configured to execute detection time window configuration software 1054 stored on the computer-readable medium 1006 to implement one or more functions described herein.

Figure 11:
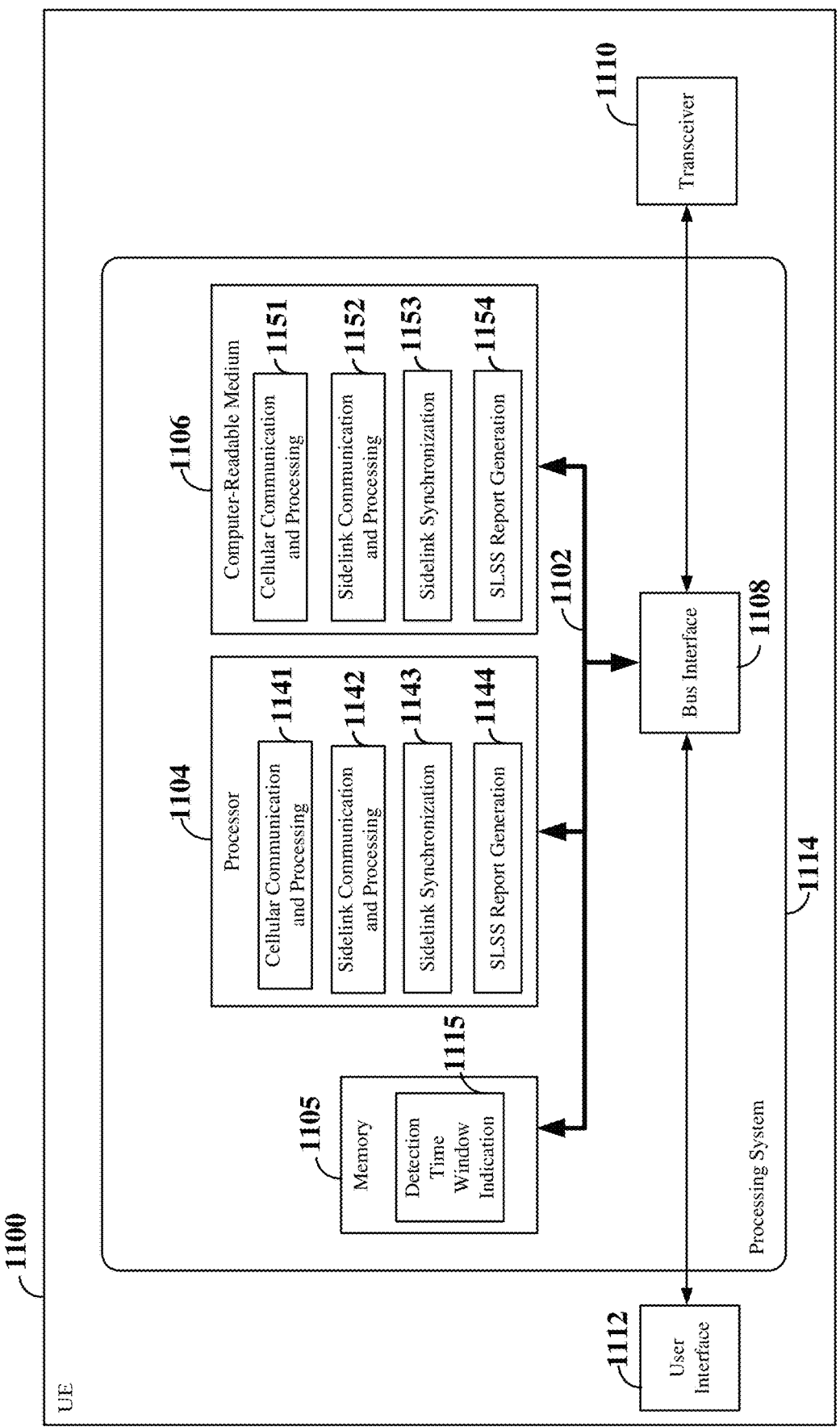
FIG. 11 is a diagram illustrating an example of a hardware implementation for a user equipment (UE) employing a processing system according to some aspects.

FIG. 11 is a block diagram illustrating an example of a hardware implementation for a user equipment (UE) 1100 employing a processing system 1114. For example, the UE 1100 may correspond to a sidelink device or a V2X device, as shown and described above in reference to FIGS. 1, 2 and/or 5.

In accordance with various aspects of the disclosure, an element, or any portion of an element, or any combination of elements may be implemented with a processing system 1114 that includes one or more processors 1104. The processing system 1114 may be substantially the same as the processing system 1014 illustrated in FIG. 10, including a bus interface 1108, a bus 1102, memory 1105, a processor 1104, and a computer-readable medium 1106. Furthermore, the UE 1100 may include a user interface 1112 and a transceiver 1110 substantially similar to those described above in FIG. 10. That is, the processor 1104, as utilized in a UE 1100, may be used to implement any one or more of the processes described below.

In some aspects of the disclosure, the processor 1104 may include circuitry configured for various functions. For example, the processor 1104 may include cellular communication and processing circuitry 1141 configured to communicate with a base station over a cellular carrier via the transceiver 1110. The cellular communication and processing circuitry 1141 may include one or more hardware components that provide the physical structure that performs processes related to wireless communication (e.g., signal reception and/or signal transmission) and signal processing (e.g., processing a received signal and/or processing a signal for transmission) over the cellular carrier.

For example, the cellular communication and processing circuitry 1141 may be configured to communicate over the cellular carrier to exchange control information and data with the base station. The cellular carrier may be time-divided into a plurality of system frames, each of which may be time-divided into a plurality of subframes, slots, and/or mini-slots. For example, the cellular communication and processing circuitry 1141 may be configured to receive and process an indication of a detection time window 1115 received from the base station. The detection time window indication 1115 may be received, for example, via RRC signaling (e.g., dedicated RRC signaling or within a broadcast SIB). The detection time window indication 1115 may further be stored, for example, in memory 1005. In some examples, the cellular communication and processing circuitry 1141 may be configured to receive respective indications of two or more detection time windows within a sidelink synchronization period and to store each of the detection time window indications 1115 in the memory 1105. The cellular communication and processing circuitry 1141 may further be configured to transmit a sidelink synchronization signal (SLSS) report to the base station. The SLSS report may be transmitted to the base station, for example, via RRC signaling or within a MAC-CE. The cellular communication and processing circuitry 1141 may further be configured to execute cellular communication and processing software 1151 stored on the computer-readable medium 1106 to implement one or more functions described herein.

The processor 1104 may further include sidelink communication and processing circuitry 1142 configured to communicate with one or more other sidelink devices (e.g., UEs) over a sidelink carrier via the transceiver 1110. The sidelink communication and processing circuitry 1142 may include one or more hardware components that provide the physical structure that performs processes related to wireless communication (e.g., signal reception and/or signal transmission) and signal processing (e.g., processing a received signal and/or processing a signal for transmission) over the sidelink carrier. In some examples, the sidelink communication and processing circuitry 1142 is included within the cellular communication and processing circuitry 1141.

For example, the sidelink communication and processing circuitry 1142 may be configured to communicate over the sidelink carrier to exchange sidelink control information and sidelink data with other sidelink devices. The sidelink carrier may be time-divided into a plurality of direct frames, each of which may be time-divided into a plurality of direct slots. In some examples, the sidelink communication and processing circuitry 1142 may be configured to transmit and/or receive a PSCCH, which may include a sidelink synchronization signal (S-SS), other control information, and/or pilot signals, and/or a PSSCH, which may include sidelink data, within a direct frame based on sidelink transmission timing. In some examples, the sidelink transmission timing may be determined based on synchronization to a synchronization source (e.g., gNB, eNB, GNSS, etc.), self-synchronization to an internal timing/frequency reference, or synchronization to another sidelink device (e.g., based on a received S-SS). The sidelink communication and processing circuitry 1142 may further be configured to execute sidelink communication and processing software 1152 stored on the computer-readable medium 1106 to implement one or more functions described herein.

The processor 1104 may further include sidelink synchronization circuitry 1143 configured to detect a sidelink synchronization signal (S-SS) transmitted by another sidelink device and received within a received direct frame (or one or more direct slots) over the sidelink carrier. In some examples, the sidelink synchronization circuitry 1143 may be configured to perform a blind detection of the S-SS within the detection time window 1115 to enable the sidelink synchronization circuitry 1143 to synchronize communication on the sidelink carrier with minimal power consumption. For example, the UE 1100 may be synchronized with the base station for communication over the cellular carrier and may access the sidelink carrier at the beginning of the detection time window 1115, as expressed in terms of SFN(s) and/or one or more system slot indexes of SFN(s), to perform the blind detection. The sidelink synchronization circuitry 1143 may further be configured to execute sidelink synchronization software 1153 stored on the computer-readable medium 1106 to implement one or more of the functions herein.

The processor 1104 may further include SLSS report generation circuitry 1144 configured to generate a SLSS report and provide the SLSS report to the cellular communication and processing circuitry 1141 for transmission to the base station. In some examples, the SLSS report generation circuitry 1144 may be configured to determine a frame offset and/or a slot offset between direct frames/slots and system frames/slots and to include the frame offset and/or slot offset in the SLSS report. The frame/slot offset between direct frames/slots and system frames/slots may be derived from communication on each of the cellular carrier and the sidelink carrier after synchronization thereon. In some examples, the SLSS report generation circuitry 1144 may be configured to determine a SLS configuration of the sidelink synchronization resource (or each sidelink synchronization resource when two or more S-SS are transmitted within a sidelink synchronization period). The SLS configuration may be determined after synchronization on the sidelink carrier. The SLSS report generation circuitry 1144 may further include the SLS configuration of the sidelink synchronization resource in the SLSS report. For example, the SLS configuration may indicate at least one direct frame or one or more direct slots of a direct frame within which the sidelink synchronization resource is located.

In some examples, the SLSS report generation circuitry 1144 may be configured to determine a detection time window expressed in terms of system frames on the cellular carrier and include an indication of the detection time window in the SLSS report. For example, the SLSS report generation circuitry 1144 may be configured to map the SLS configuration expressed as at least one DFN or one or more direct slot indexes of a DFN to a detection time window configuration expressed as at least one SFN or at least one system slot index of at least one SFN based on the frame/slot offset between direct frames/slots and system frames/slots. The SLSS report generation circuitry 1144 may include an indication of the SFN(s) or system slot index(es) of the SFN(s) of the detection time window in the SLSS report. The SLSS report generation circuitry 1144 may further be configured to execute SLSS report generation software 1154 stored on the computer-readable medium 1106 to implement one or more of the functions described herein.

Figure 12:
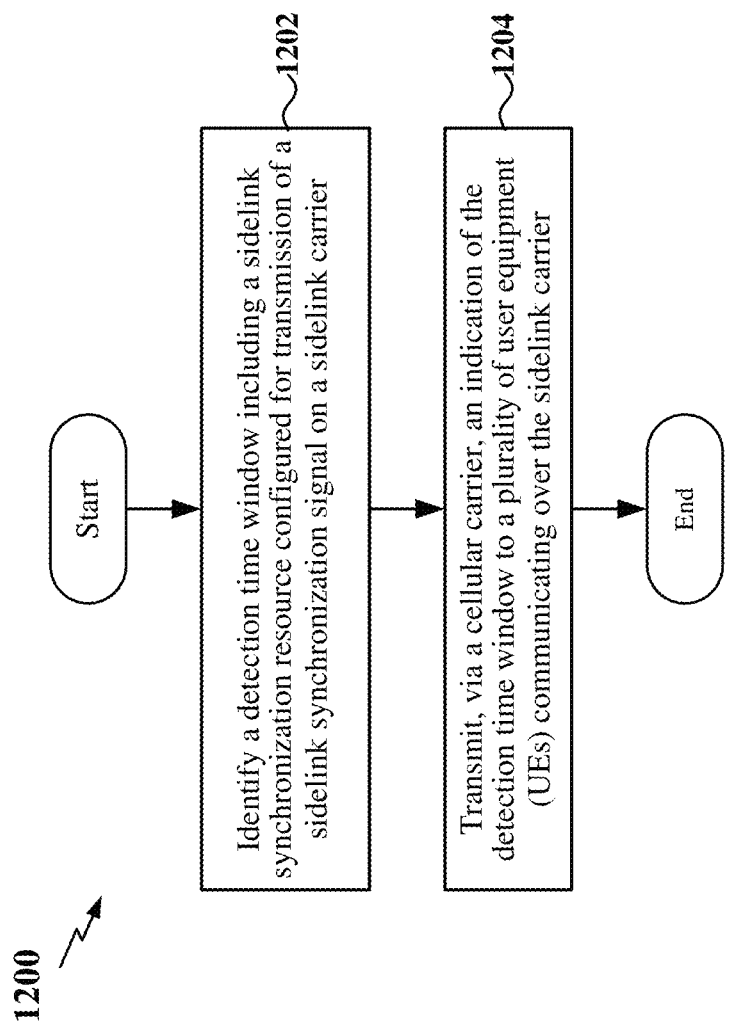
FIG. 12 is a flow chart of an exemplary method for a base station to provide sidelink synchronization assistance according to some aspects.

FIG. 12 is a flow chart 1200 of a method for a base station to provide sidelink synchronization assistance according to some aspects. As described below, some or all illustrated features may be omitted in a particular implementation within the scope of the present disclosure, and some illustrated features may not be required for implementation of all examples. In some examples, the method may be performed by the base station 1000, as described above and illustrated in FIG. 10, by a processor or processing system, or by any suitable means for carrying out the described functions.

At block 1202, the base station may identify a detection time window including a sidelink synchronization resource configured for transmission of a sidelink synchronization signal on a sidelink carrier. In some examples, the base station may be configured to identify a sidelink synchronization configuration of the sidelink synchronization resource and determine the detection time window based on the sidelink synchronization resource. In some examples, the base station may map the sidelink synchronization configuration expressed as at least one DFN of at least one direct frame within which the sidelink synchronization resource is located to a detection time window configuration expressed as at least one SFN of at least one system frame covering a duration of time including the sidelink synchronization resource. In some examples, the base station may map the sidelink synchronization configuration expressed as at least one direct slot index of at least one direct slot of a direct frame number of a direct frame within which the sidelink synchronization resource is located to the detection time window configuration expressed as at least one system slot index of at least one system slot of at least one system frame number of at least one system frame. The at least one system slot covers a duration of time including the at least one direct slot. In some examples, the base station may map the sidelink synchronization configuration to the detection time window configuration based on an offset in time between direct frames/slots and system frames/slots.

In some examples, the sidelink synchronization configuration may be pre-configured on the base station or received within a sidelink synchronization signal (SLSS) report from one or more UEs communicating with the base station and on the sidelink carrier. In some examples, the frame/slot offset may be determined by the base station (e.g., by deriving the DFN from GNSS timing) or may be received within the SLSS report. In some examples, the SLSS report may include an indication of the detection time window as determined by one of the UEs communicating with the base station and on the sidelink carrier. For example, the detection time window identification circuitry 1044, together with the sidelink offset determination circuitry 1043, shown and described above in connection with FIG. 10 may provide a means to identify the detection time window.

At block 1204, the base station may transmit, via a cellular carrier, an indication of the detection time window to a plurality of UEs communicating over the sidelink carrier. In some examples, the base station may transmit the indication of the detection time window via RRC signaling. For example, the base station may broadcast the indication of the detection time window within a SIB or may utilize dedicated RRC signaling to transmit the indication of the detection time window. For example, the communication and processing circuitry 1042, together with the transceiver 1010, shown and described above in connection with FIG. 10 may provide a means to transmit the indication of the detection time window to the plurality of UEs.

Figure 13:
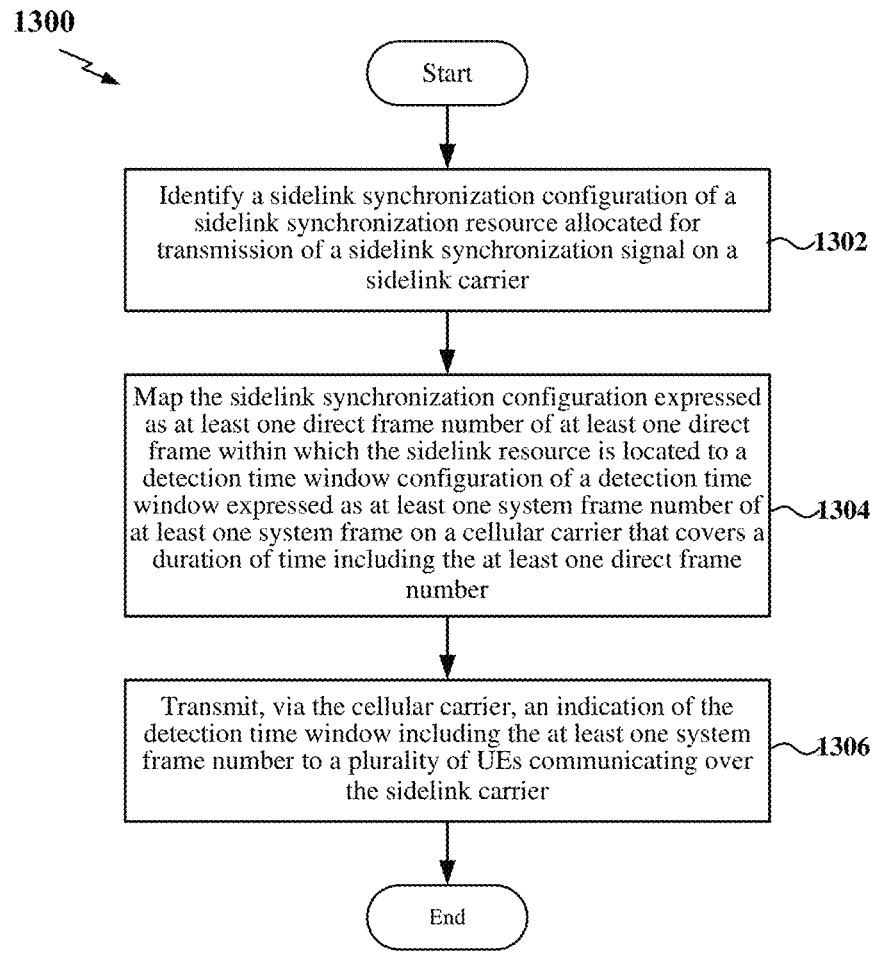
FIG. 13 is a flow chart of another exemplary method for a base station to provide sidelink synchronization assistance according to some aspects.

FIG. 13 is a flow chart 1300 of another method for a base station to provide sidelink synchronization assistance according to some aspects. As described below, some or all illustrated features may be omitted in a particular implementation within the scope of the present disclosure, and some illustrated features may not be required for implementation of all examples. In some examples, the method may be performed by the base station 1000, as described above and illustrated in FIG. 10, by a processor or processing system, or by any suitable means for carrying out the described functions.

At block 1302, the base station may identify a sidelink synchronization configuration of a sidelink synchronization resource allocated for transmission of a sidelink synchronization signal on a sidelink carrier. For example, the detection time window identification circuitry 1044 shown and described above in connection with FIG. 10 may provide a means to identify the sidelink synchronization configuration.

At block 1304, the base station may map the sidelink synchronization configuration expressed as at least one DFN of at least one direct frame within which the sidelink synchronization resource is located to a detection time window configuration of a detection time window expressed as at least one SFN of at least one system frame covering a duration of time including the sidelink synchronization resource. In some examples, the base station may map the sidelink synchronization configuration to the detection time window configuration by identifying an offset in time between a plurality of direct frames and a plurality of system frames, and mapping the respective direct frame number of each of the at least one direct frame to the respective system frame number of each of the at least one system frame based on the offset. In some examples, the base station may further synchronize with a global navigation satellite system (GNSS) to obtain a current time, and deriving the respective direct frame number of each of the at least one direct frame from the current time. For example, the detection time window identification circuitry 1044, together with the sidelink offset determination circuitry 1043, shown and described above in connection with FIG. 10 may provide a means to map the sidelink synchronization configuration to the detection time window configuration.

At block 1306, the base station may transmit, via the cellular carrier, an indication of the detection time window including the at least one SFN to a plurality of UEs communicating over the sidelink carrier. In some examples, the base station may transmit the indication of the detection time window via RRC signaling. For example, the base station may broadcast the indication of the detection time window within a SIB or may utilize dedicated RRC signaling to transmit the indication of the detection time window. For example, the communication and processing circuitry 1042, together with the transceiver 1010, shown and described above in connection with FIG. 10 may provide a means to transmit the indication of the detection time window to the plurality of UEs.

Figure 14:
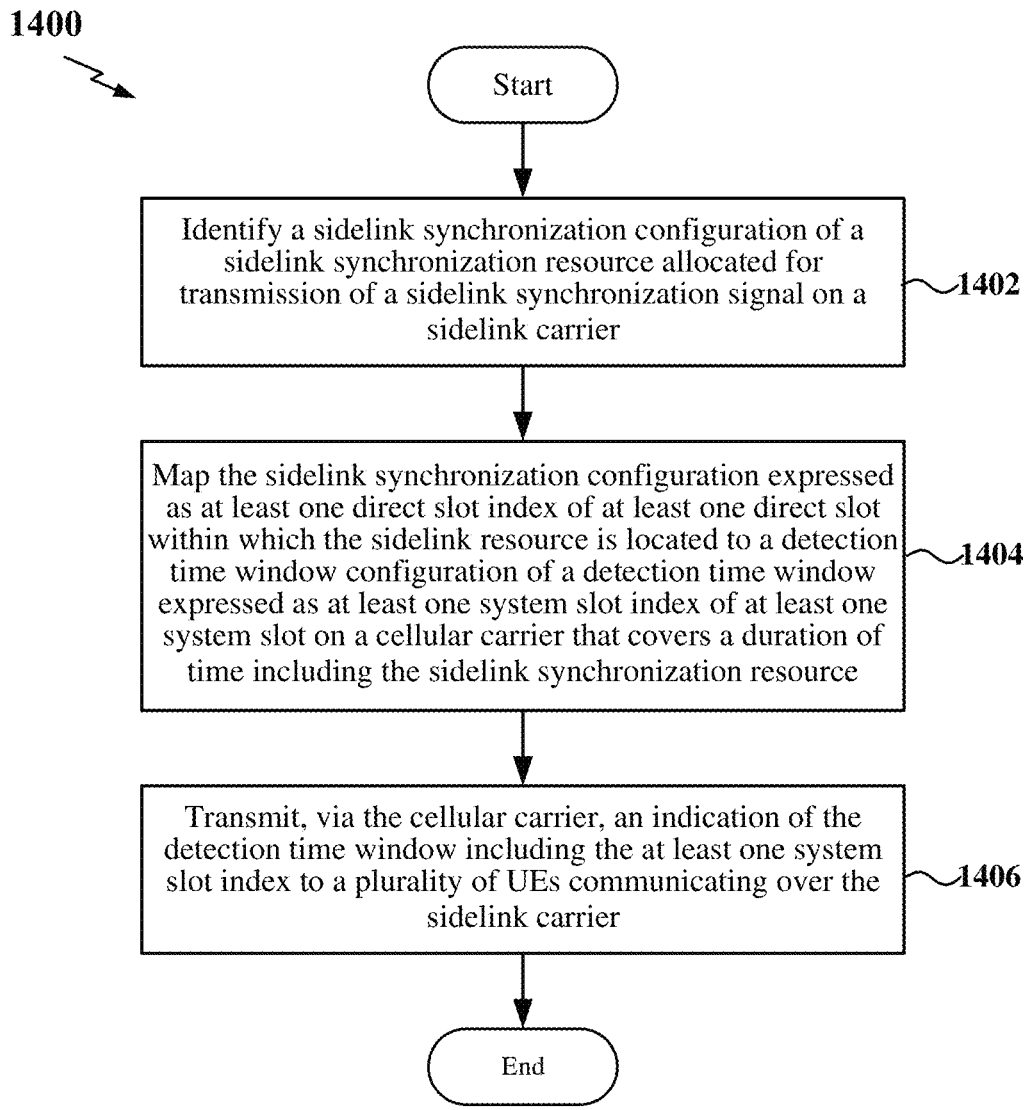
FIG. 14 is a flow chart of another exemplary method for a base station to provide sidelink synchronization assistance according to some aspects.

FIG. 14 is a flow chart 1400 of another method for a base station to provide sidelink synchronization assistance according to some aspects. As described below, some or all illustrated features may be omitted in a particular implementation within the scope of the present disclosure, and some illustrated features may not be required for implementation of all examples. In some examples, the method may be performed by the base station 1000, as described above and illustrated in FIG. 10, by a processor or processing system, or by any suitable means for carrying out the described functions.

At block 1402, the base station may identify a sidelink synchronization configuration of a sidelink synchronization resource allocated for transmission of a sidelink synchronization signal on a sidelink carrier. For example, the detection time window identification circuitry 1044 shown and described above in connection with FIG. 10 may provide a means to identify the sidelink synchronization configuration.

At block 1404, the base station may map the sidelink synchronization configuration expressed as at least one direct slot index of at least one direct slot of a direct frame number of a direct frame within which the sidelink synchronization resource is located to the detection time window configuration expressed as at least one system slot index of at least one system slot of at least one system frame number of at least one system frame. The at least one system slot covers a duration of time including the sidelink synchronization resource. In some examples, the base station may map the sidelink synchronization configuration to the detection time window configuration based on an offset in time between direct frames/slots and system frames/slots. For example, the detection time window identification circuitry 1044, together with the sidelink offset determination circuitry 1043, shown and described above in connection with FIG. 10 may provide a means to map the sidelink synchronization configuration to the detection time window configuration.

At block 1406, the base station may transmit, via the cellular carrier, an indication of the detection time window including the at least one system slot index to a plurality of UEs communicating over the sidelink carrier. In some examples, the base station may transmit the indication of the detection time window via RRC signaling. For example, the base station may broadcast the indication of the detection time window within a SIB or may utilize dedicated RRC signaling to transmit the indication of the detection time window. For example, the communication and processing circuitry 1042, together with the transceiver 1010, shown and described above in connection with FIG. 10 may provide a means to transmit the indication of the detection time window to the plurality of UEs.

In one configuration, the base station 1000 includes means for providing sidelink synchronization assistance as described in the present disclosure. In one aspect, the aforementioned means may be the processor 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the computer-readable storage medium 1006, or any other suitable apparatus or means described in any one of the FIGS. 1, 2, and/or 5-7, and utilizing, for example, the processes and/or algorithms described herein in relation to FIGS. 12-14.

Figure 15:
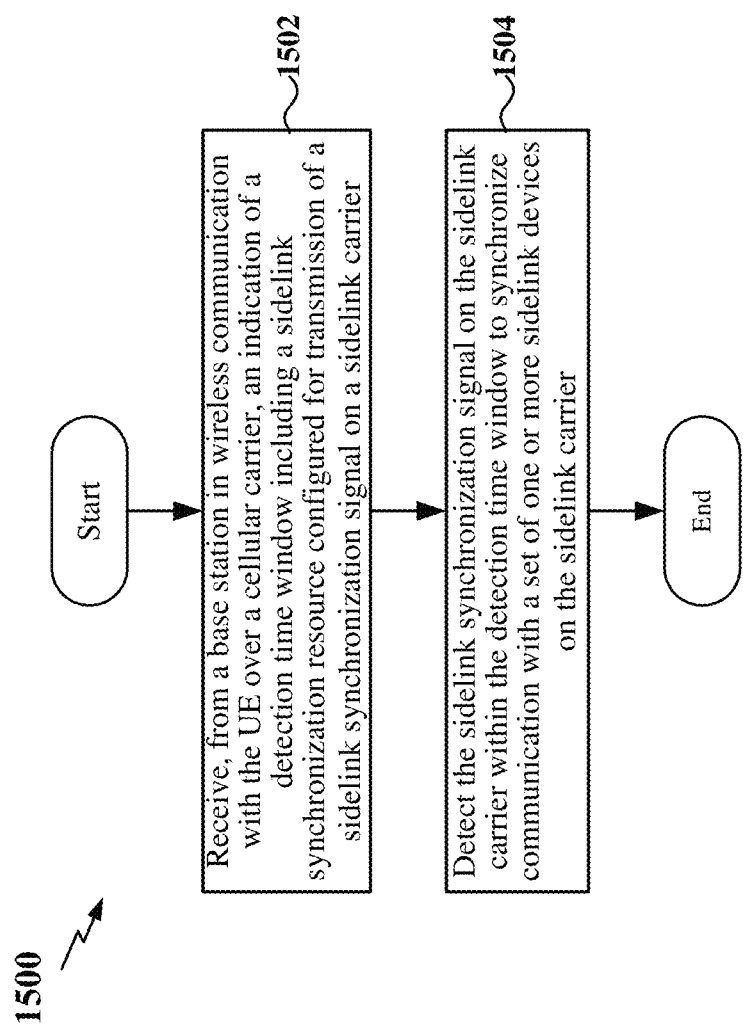
FIG. 15 is a flow chart of a method for sidelink synchronization at a user equipment (UE) according to some aspects.

FIG. 15 is a flow chart 1500 of a method for sidelink synchronization at a user equipment (UE) according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1502, the UE may receive, from a base station in wireless communication with the UE over a cellular carrier, an indication of a detection time window including a sidelink synchronization resource configured for transmission of a sidelink synchronization signal on a sidelink carrier. In some examples, the UE may receive the indication of the detection time window via RRC signaling. In some examples, the indication of the detection time window may include at least one SFN of at least one system frame on the cellular carrier corresponding to at least one DFN of at least one direct frame on the sidelink carrier within which the sidelink synchronization resource is located. In some examples, the indication of the detection time window includes at least one system slot index of at least one system frame number on the cellular carrier corresponding to at least one direct slot index of a direct frame number on the sidelink carrier within which the sidelink synchronization resource is located. In some examples, a detection time window size of the detection time window is equal to or larger than a direct slot size of the at least one direct slot. For example, the cellular communication and processing circuitry 1141, together with the transceiver 1110, as shown and described above in connection with FIG. 11 may provide a means to receive the indication of the detection time window.

At block 1504, the UE may detect the sidelink synchronization signal on the sidelink carrier within the detection time window to synchronize communication with a set of one or more sidelink devices on the sidelink carrier. For example, the sidelink synchronization circuitry 1143, together with the sidelink communication and processing circuitry 1142 and transceiver 1110, as shown and described above in connection with FIG. 11 may provide a means to detect the sidelink synchronization signal within the detection time window.

Figure 16:
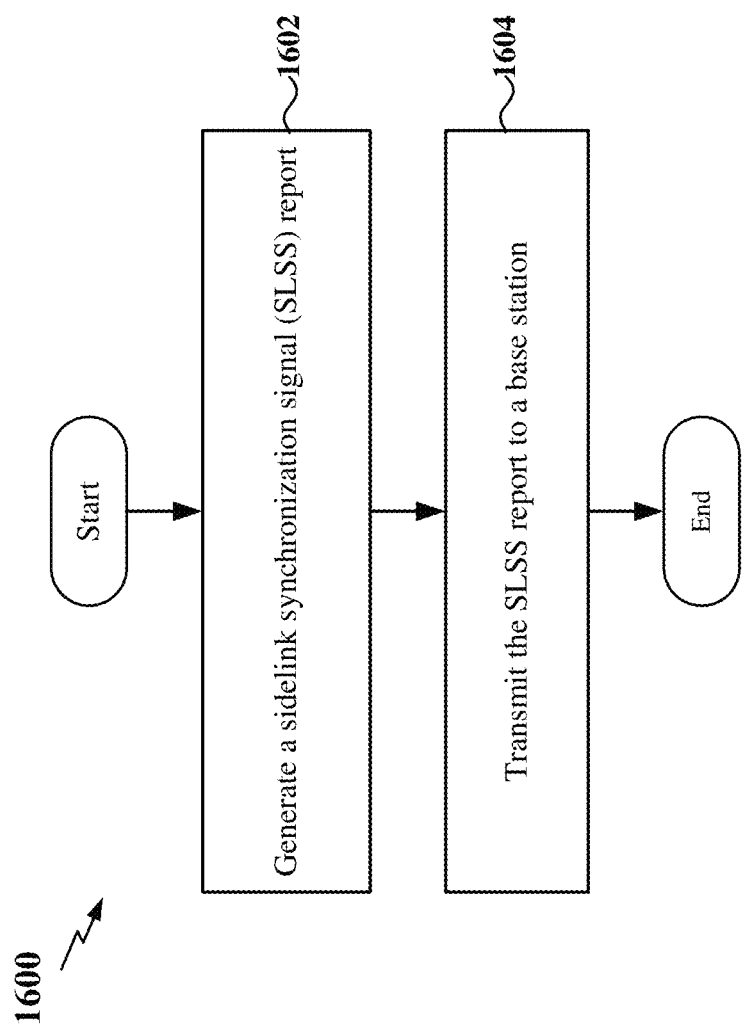
FIG. 16 is a flow chart of a method for a user equipment (UE) to assist a base station in providing sidelink synchronization assistance according to some aspects.

FIG. 16 is a flow chart 1600 of a method for a user equipment (UE) to assist a base station in providing sidelink synchronization assistance according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1602, the UE may generate a sidelink synchronization signal (SLSS) report. In some examples, the SLSS report may include an offset in time between direct frames/slots on a sidelink carrier and system frames/slots on a cellular carrier. In some examples, the SLSS report may include a sidelink synchronization configuration of a sidelink synchronization resource configured for transmission of a sidelink synchronization signal on the sidelink carrier. In some examples, the SLSS report may include an indication of a detection time window expressed in terms of system frame numbers, where the detection time window includes the sidelink synchronization resource. For example, the SLSS report generation circuitry 1144, shown and described above in connection with FIG. 11 may provide a means to generate the SLSS report.

At block 1604, the UE may transmit the SLSS report to a base station. The base station may utilize the SLSS information in the SLSS report to provide sidelink synchronization assistance to other UEs communicating on the sidelink carrier. In some examples, the UE may transmit the SLSS report via RRC signaling or within a MAC-CE. For example, the cellular communication and processing circuitry 1141, together with the transceiver 1110, shown and described above in connection with FIG. 11 may provide a means to transmit the SLSS report to the base station.

In one configuration, the UE 1100 includes means for implementing sidelink synchronization as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, and/or 5-7, and utilizing, for example, the processes and/or algorithms described herein in relation to FIGS. 15 and 16.

The following provides an overview of examples of the present disclosure.

Example 1: A method for a base station to provide sidelink synchronization assistance, the method comprising: identifying a detection time window, wherein the detection time window comprises a sidelink synchronization resource configured for transmission of a sidelink synchronization signal on a sidelink carrier; and transmitting, via a cellular carrier, an indication of the detection time window to a plurality of user equipment (UEs) communicating over the sidelink carrier.

Example 2: The method of example 1, wherein: the sidelink carrier is time-divided into a plurality of direct frames, wherein each of the plurality of direct frames are indexed by a respective direct frame number of a plurality of direct frame numbers, and the cellular carrier is time-divided into a plurality of system frames, wherein each of the plurality of system frames are indexed by a respective system frame number of a plurality of system frame numbers.

Example 3: The method of example 2, wherein the identifying the detection time window further comprises: identifying a sidelink synchronization configuration of the sidelink synchronization resource configured for transmission of the sidelink synchronization signal on the sidelink carrier; and determining the detection time window based on the sidelink synchronization configuration.

Example 4: The method of example 3, wherein the sidelink synchronization configuration indicates at least one direct frame of the plurality of direct frames within which the sidelink synchronization resource is located.

Example 5: The method of example 4, wherein the identifying the detection time window further comprises: mapping the sidelink synchronization configuration expressed as at least one direct frame number of the at least one direct frame to a detection time window configuration of the detection time window expressed as at least one system frame number of at least one system frame of the plurality of system frames that covers a duration of time comprising the sidelink synchronization resource, wherein the indication of the detection time window comprises the at least one system frame number.

Example 6: The method of example 5, wherein the mapping the sidelink synchronization configuration to the detection time window configuration further comprises: identifying an offset in time between the plurality of direct frames and the plurality of system frames; and mapping the respective direct frame number of each of the at least one direct frame to the respective system frame number of each of the at least one system frame based on the offset.

Example 7: The method of example 5 or 6, further comprising: synchronizing with a global navigation satellite system (GNSS) to obtain a current time; and deriving the respective direct frame number of each of the at least one direct frame from the current time.

Example 8: The method of any of examples 3 through 7, wherein: each of the plurality of direct frames are further time-divided into a plurality of direct slots, wherein each of the plurality of direct slots are indexed by a respective direct slot index of a plurality of direct slot indexes, each of the plurality of system frames are further time-divided into a plurality of system slots, wherein each of the plurality of system slots are indexed by a respective system slot index of a plurality of system slot indexes, and the sidelink synchronization configuration indicates at least one direct slot index of the plurality of direct slot indexes of at least one direct slot of the plurality of direct slots within which the sidelink synchronization resource is located.

Example 9: The method of example 8, wherein the identifying the detection time window further comprises: mapping the sidelink synchronization configuration expressed as the at least one direct slot index to a detection time window configuration of the detection time window expressed as at least one system slot index of the plurality of system slot indexes of at least one system slot of the plurality of system slots, wherein the at least one system slot covers a duration of time comprising the sidelink synchronization resource, wherein the indication of the detection time window comprises the at least one system slot index.

Example 10: The method of example 9, wherein a detection time window size of the detection time window is equal to or larger than a direct slot size of the at least one direct slot.

Example 11: The method of example 3, further comprising: receiving a sidelink synchronization signal report from a user equipment of the plurality of user equipment, wherein the sidelink synchronization signal report comprises the sidelink synchronization configuration or an offset in time between the plurality of direct frames and the plurality of system frames.

Example 12: The method of example 2, further comprising: receiving a sidelink synchronization signal report from a user equipment of the plurality of user equipment, wherein the sidelink synchronization signal report comprises the indication of the detection time window expressed in terms of the plurality of system frame numbers.

Example 13: The method of any of examples 2 through 12, wherein the identifying the detection time window further comprises: identifying two or more detection time windows within a sidelink synchronization period, wherein each of the two or more detection time windows comprises a respective sidelink synchronization resource.

Example 14: The method of any of examples 1 through 13, wherein transmitting, via the cellular carrier, the indication of the detection time window further comprises: transmitting the indication of the detection time window via radio resource control (RRC) signaling, or broadcasting the indication of the detection time window within a system information block.

Example 15: A base station comprising a wireless transceiver, a memory, and processor coupled to the wireless transceiver and the memory, the processor and memory configured to perform a method of any one of examples 1 through 14.

Example 16: A base station comprising at least one means for performing a method of any one of examples 1 through 14.

Example 17: An article of manufacture for use by a base station comprising a non-transitory computer-readable medium having stored therein instructions executable by one or more processors of the base station to perform a method of any one of examples 1 through 14.

Example 18: A method for sidelink synchronization at a user equipment (UE), the method comprising: receiving, from a base station in wireless communication with the UE over a cellular carrier, an indication of a detection time window comprising a sidelink synchronization resource configured for transmission of a sidelink synchronization signal on a sidelink carrier; and detecting the sidelink synchronization signal on the sidelink carrier within the detection time window to synchronize communication with a set of one or more sidelink devices on the sidelink carrier.

Example 19: The method of example 18, wherein: the sidelink carrier is time-divided into a plurality of direct frames, each of the plurality of direct frames being indexed by a respective direct frame number of a plurality of direct frame numbers, and the cellular carrier is time-divided into a plurality of system frames, each of the plurality of system frames being indexed by a respective system frame number of a plurality of system frame numbers.

Example 20: The method of example 19, wherein the sidelink synchronization resource is located within at least one direct frame of the plurality of direct frames and the indication of the detection time window comprises at least one system frame number of the plurality of system frame numbers of at least one system frame of the plurality of system frames that covers a duration of time comprising the sidelink synchronization resource.

Example 21: The method of example 20, wherein the plurality of direct frames and the plurality of system frames are offset in time.

Example 22: The method of any of examples 19 through 21, wherein: each of the plurality of direct frames are further time-divided into a plurality of direct slots, wherein each of the plurality of direct slots are indexed by a respective direct slot index of a plurality of direct slot indexes, each of the plurality of system frames are further time-divided into a plurality of system slots, wherein each of the plurality of system slots are indexed by a respective system slot index of a plurality of system slot indexes, and the sidelink synchronization resource is located within at least one direct slot of the plurality of direct slots.

Example 23: The method of example 22, wherein: the indication of the detection time window comprises at least one system slot index of the plurality of system slot indexes of at least one system slot of the plurality of system slots that covers a duration of time comprising the sidelink synchronization resource, and a detection time window size of the detection time window is equal to or larger than a direct slot size of the at least one direct slot.

Example 24: The method of any of examples 19 through 23, wherein the receiving the indication of the detection time window further comprises: receiving respective indications of two or more detection time windows within a sidelink synchronization period, each of the two or more detection time windows comprising a respective sidelink synchronization resource.

Example 25: The method of example 19, further comprising: transmitting a sidelink synchronization signal report to the base station.

Example 26: The method of example 25, wherein the sidelink synchronization signal report comprises: an offset in time between the plurality of direct frames and the plurality of system frames, a sidelink synchronization configuration of the sidelink synchronization resource configured for transmission of the sidelink synchronization signal on the sidelink carrier, or the indication of the detection time window expressed in terms of the plurality of system frame numbers.

Example 27: The method of any of examples 18 through 26, wherein the receiving the indication of the detection time window further comprises: receiving the indication of the detection time window via radio resource control (RRC) signaling.

Example 28: The method of any of examples 18 through 26, wherein the receiving the indication of the detection time window further comprises: receiving the indication of the detection time window within a system information block.

Example 29: A user equipment (UE) comprising a wireless transceiver, a memory, and processor coupled to the wireless transceiver and the memory, the processor and memory configured to perform a method of any one of examples 18 through 28.

Example 30: A UE comprising at least one means for performing a method of any one of examples 18 through 28.

Example 31: An article of manufacture for use by a UE comprising a non-transitory computer-readable medium having stored therein instructions executable by one or more processors of the UE to perform a method of any one of examples 18 through 28.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-16 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5-7, 10 and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for a base station to provide sidelink synchronization assistance, the method comprising:
identifying a detection time window, wherein the detection time window comprises a sidelink synchronization resource configured for transmission of a sidelink synchronization signal on a sidelink carrier; and
transmitting, via a cellular carrier, an indication of the detection time window to a plurality of user equipment (UEs) communicating over the sidelink carrier.

2. The method of claim 1, wherein:
the sidelink carrier is time-divided into a plurality of direct frames, wherein each of the plurality of direct frames are indexed by a respective direct frame number of a plurality of direct frame numbers, and
the cellular carrier is time-divided into a plurality of system frames, wherein each of the plurality of system frames are indexed by a respective system frame number of a plurality of system frame numbers.

3. The method of claim 2, wherein the identifying the detection time window further comprises:
identifying a sidelink synchronization configuration of the sidelink synchronization resource configured for transmission of the sidelink synchronization signal on the sidelink carrier; and
determining the detection time window based on the sidelink synchronization configuration.

4. The method of claim 3, wherein the sidelink synchronization configuration indicates at least one direct frame of the plurality of direct frames within which the sidelink synchronization resource is located.

5. The method of claim 4, wherein the identifying the detection time window further comprises:
mapping the sidelink synchronization configuration expressed as at least one direct frame number of the at least one direct frame to a detection time window configuration of the detection time window expressed as at least one system frame number of at least one system frame of the plurality of system frames that covers a duration of time comprising the sidelink synchronization resource, wherein the indication of the detection time window comprises the at least one system frame number.

6. The method of claim 5, wherein the mapping the sidelink synchronization configuration to the detection time window configuration further comprises:
identifying an offset in time between the plurality of direct frames and the plurality of system frames; and
mapping the respective direct frame number of each of the at least one direct frame to the respective system frame number of each of the at least one system frame based on the offset.

7. The method of claim 5, further comprising:
synchronizing with a global navigation satellite system (GNSS) to obtain a current time; and
deriving the respective direct frame number of each of the at least one direct frame from the current time.

8. The method of claim 3, wherein:
each of the plurality of direct frames are further time-divided into a plurality of direct slots, wherein each of the plurality of direct slots are indexed by a respective direct slot index of a plurality of direct slot indexes,
each of the plurality of system frames are further time-divided into a plurality of system slots, wherein each of the plurality of system slots are indexed by a respective system slot index of a plurality of system slot indexes, and
the sidelink synchronization configuration indicates at least one direct slot index of the plurality of direct slot indexes of at least one direct slot of the plurality of direct slots within which the sidelink synchronization resource is located.

9. The method of claim 8, wherein the identifying the detection time window further comprises:
mapping the sidelink synchronization configuration expressed as the at least one direct slot index to a detection time window configuration of the detection time window expressed as at least one system slot index of the plurality of system slot indexes of at least one system slot of the plurality of system slots, wherein the at least one system slot covers a duration of time comprising the sidelink synchronization resource, wherein the indication of the detection time window comprises the at least one system slot index.

10. The method of claim 9, wherein a detection time window size of the detection time window is equal to or larger than a direct slot size of the at least one direct slot.

11. The method of claim 3, further comprising:
receiving a sidelink synchronization signal report from a user equipment of the plurality of user equipment, wherein the sidelink synchronization signal report comprises the sidelink synchronization configuration or an offset in time between the plurality of direct frames and the plurality of system frames.

12. The method of claim 2, further comprising:
receiving a sidelink synchronization signal report from a user equipment of the plurality of user equipment, wherein the sidelink synchronization signal report comprises the indication of the detection time window expressed in terms of the plurality of system frame numbers.

13. The method of claim 2, wherein the identifying the detection time window further comprises:
identifying two or more detection time windows within a sidelink synchronization period, wherein each of the two or more detection time windows comprises a respective sidelink synchronization resource.

14. The method of claim 1, wherein transmitting, via the cellular carrier, the indication of the detection time window further comprises:
transmitting the indication of the detection time window via radio resource control (RRC) signaling, or
broadcasting the indication of the detection time window within a system information block.

15. A base station, comprising:
a processor;
a wireless transceiver communicatively coupled to the processor and configured to communicate over a cellular carrier; and
a memory communicatively coupled to the processor, wherein the processor and the memory are configured to:
identify a detection time window, wherein the detection time window comprises a sidelink synchronization resource configured for transmission of a sidelink synchronization signal on a sidelink carrier; and
transmit, via the cellular carrier, an indication of the detection time window to a plurality of user equipment (UEs) communicating over the sidelink carrier.

16. The base station of claim 15, wherein the sidelink carrier is time-divided into a plurality of direct frames, wherein each of the plurality of direct frames are indexed by a respective direct frame number of a plurality of direct frame numbers, and the cellular carrier is time-divided into a plurality of system frames, wherein each of the plurality of system frames are indexed by a respective system frame number of a plurality of system frame numbers, and wherein the processor and the memory are further configured to:
map a sidelink synchronization configuration expressed as at least one direct frame number of the plurality of direct frame numbers of at least one direct frame of the plurality of direct frames to a detection time window configuration of the detection time window expressed as at least one system frame number of at least one system frame of the plurality of system frames that covers a duration of time comprising the sidelink synchronization resource, wherein the indication of the detection time window comprises the at least one system frame number.

17. A method for sidelink synchronization at a user equipment (UE), the method comprising:
receiving, from a base station in wireless communication with the UE over a cellular carrier, an indication of a detection time window comprising a sidelink synchronization resource configured for transmission of a sidelink synchronization signal on a sidelink carrier; and
detecting the sidelink synchronization signal on the sidelink carrier within the detection time window to synchronize communication with a set of one or more sidelink devices on the sidelink carrier.

18. The method of claim 17, wherein:
the sidelink carrier is time-divided into a plurality of direct frames, each of the plurality of direct frames being indexed by a respective direct frame number of a plurality of direct frame numbers, and
the cellular carrier is time-divided into a plurality of system frames, each of the plurality of system frames being indexed by a respective system frame number of a plurality of system frame numbers.

19. The method of claim 18, wherein the sidelink synchronization resource is located within at least one direct frame of the plurality of direct frames and the indication of the detection time window comprises at least one system frame number of the plurality of system frame numbers of at least one system frame of the plurality of system frames that covers a duration of time comprising the sidelink synchronization resource.

20. The method of claim 19, wherein the plurality of direct frames and the plurality of system frames are offset in time.

21. The method of claim 18, wherein:
each of the plurality of direct frames are further time-divided into a plurality of direct slots, wherein each of the plurality of direct slots are indexed by a respective direct slot index of a plurality of direct slot indexes,
each of the plurality of system frames are further time-divided into a plurality of system slots, wherein each of the plurality of system slots are indexed by a respective system slot index of a plurality of system slot indexes, and
the sidelink synchronization resource is located within at least one direct slot of the plurality of direct slots.

22. The method of claim 21, wherein:
the indication of the detection time window comprises at least one system slot index of the plurality of system slot indexes of at least one system slot of the plurality of system slots that covers a duration of time comprising the sidelink synchronization resource, and
a detection time window size of the detection time window is equal to or larger than a direct slot size of the at least one direct slot.

23. The method of claim 18, wherein the receiving the indication of the detection time window further comprises:
receiving respective indications of two or more detection time windows within a sidelink synchronization period, each of the two or more detection time windows comprising a respective sidelink synchronization resource.

24. The method of claim 18, further comprising:
transmitting a sidelink synchronization signal report to the base station.

25. The method of claim 24, wherein the sidelink synchronization signal report comprises:
an offset in time between the plurality of direct frames and the plurality of system frames,
a sidelink synchronization configuration of the sidelink synchronization resource configured for transmission of the sidelink synchronization signal on the sidelink carrier, or
the indication of the detection time window expressed in terms of the plurality of system frame numbers.

26. The method of claim 17, wherein the receiving the indication of the detection time window further comprises:
receiving the indication of the detection time window via radio resource control (RRC) signaling.

27. The method of claim 17, wherein the receiving the indication of the detection time window further comprises:
receiving the indication of the detection time window within a system information block.

28. A user equipment (UE), comprising:
a processor;
a wireless transceiver communicatively coupled to the processor and configured to communicate over a cellular carrier with a base station and over a sidelink carrier with a set of one or more sidelink devices; and
a memory communicatively coupled to the processor, wherein the processor and the memory are configured to:
receive, from the base station, an indication of a detection time window comprising a sidelink synchronization resource configured for transmission of a sidelink synchronization signal on the sidelink carrier; and
detect the sidelink synchronization signal on the sidelink carrier within the detection time window to synchronize communication with the set of one or more sidelink devices on the sidelink carrier.

29. The UE of claim 28, wherein:
the sidelink carrier is time-divided into a plurality of direct frames, each of the plurality of direct frames being indexed by a respective direct frame number of a plurality of direct frame numbers,
the cellular carrier is time-divided into a plurality of system frames, each of the plurality of system frames being indexed by a respective system frame number of a plurality of system frame numbers, and
the sidelink synchronization resource is located within at least one direct frame of the plurality of direct frames and the indication of the detection time window comprises at least one system frame number of the plurality of system frame numbers of at least one system frame of the plurality of system frames that covers a duration of time comprising the sidelink synchronization resource.

30. The UE of claim 28, wherein:
the sidelink carrier is time-divided into a plurality of direct frames, each of the plurality of direct frames being indexed by a respective direct frame number of a plurality of direct frame numbers, each of the plurality of direct frames being further time-divided into a plurality of direct slots, wherein each of the plurality of direct slots are indexed by a respective direct slot index of a plurality of direct slot indexes the cellular carrier is time-divided into a plurality of system frames, each of the plurality of system frames being indexed by a respective system frame number of a plurality of system frame numbers, each of the plurality of system frames being further time-divided into a plurality of system slots, wherein each of the plurality of system slots are indexed by a respective system slot index of a plurality of system slot indexes, and the sidelink synchronization resource is located within at least one direct slot of the plurality of direct slots.

* * * * *